(12) United States Patent
Jiang et al.

(10) Patent No.: US 11,184,751 B2
(45) Date of Patent: *Nov. 23, 2021

(54) SYSTEM AND METHOD FOR RANGING-ASSISTED VEHICLE POSITIONING

(71) Applicant: QUALCOMM Incorporated, San Diego, CA (US)

(72) Inventors: Libin Jiang, Seattle, WA (US); Junyi Li, Chester, NJ (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,750

(22) Filed: Jun. 5, 2020

(65) Prior Publication Data

US 2020/0304970 A1 Sep. 24, 2020

Related U.S. Application Data

(63) Continuation of application No. 16/228,051, filed on Dec. 20, 2018, now Pat. No. 10,715,977.

(Continued)

(51) Int. Cl.
*H04W 4/46* (2018.01)
*H04W 64/00* (2009.01)
(Continued)

(52) U.S. Cl.
CPC ............. *H04W 4/46* (2018.02); *G01S 5/0205* (2013.01); *G01S 5/0289* (2013.01);
(Continued)

(58) Field of Classification Search
CPC ..... H04W 4/46; H04W 16/14; H04W 72/044; H04W 72/12; H04W 72/1278;
(Continued)

(56) References Cited

U.S. PATENT DOCUMENTS 10,064,148 B2 * 8/2018 Xia .................. H04W 56/0015
10,172,025 B2 * 1/2019 Vamaraju ............. H04W 64/00
(Continued)

OTHER PUBLICATIONS

Bucaille I., et al., "MAC Layer Design for UWB LDR Systems: PULSERS Proposal", Positioning, Navigation and Communication, 2007, WPNC '07. 4TH Workshop on, IEEE, PI, Mar. 1, 2007 (Mar. 1, 2007), pp. 277-283, XP031080650, ISBN: 978-1-4244-0870-2, Sections: I, III, III.1, III .4, III .5.
(Continued)

*Primary Examiner* — Khawar Iqbal
(74) *Attorney, Agent, or Firm* — Campbell C. Chiang; Loza & Loza LLP

(57) ABSTRACT

Aspects of the present disclosure are directed to device-to-device (D2D) and, more particularly, vehicle-to-vehicle (V2V) communication in which an efficient ranging protocol allows efficient ranging-assisted vehicle positioning. A vehicle transmits a first slot ID in a first control period, to indicate a first time slot for transmitting a first ranging signal in a ranging cycle including a plurality of time slots. The vehicle transmits the first ranging signal in the first time slot in the ranging cycle. From a second vehicle, the first vehicle receives a second ranging signal in a second time slot that is different from the first time slot in the ranging cycle. The first vehicle determines a first time-of-arrival (ToA) of the second ranging signal when received by the first vehicle, and transmits the first ToA in a second control period.

22 Claims, 17 Drawing Sheets

Related U.S. Application Data

(60) Provisional application No. 62/611,182, filed on Dec. 28, 2017.

(51) Int. Cl.

| | | |
|---|---|---|
| *G01S 5/02* | (2010.01) | |
| *H04W 16/14* | (2009.01) | |
| *H04W 72/04* | (2009.01) | |
| *H04W 72/12* | (2009.01) | |
| *G01S 5/00* | (2006.01) | |
| *G01S 1/04* | (2006.01) | |

(52) U.S. Cl.
CPC ........... *H04W 16/14* (2013.01); *H04W 64/00* (2013.01); *H04W 72/044* (2013.01); *H04W 72/1278* (2013.01); *G01S 1/042* (2013.01); *G01S 5/0063* (2013.01); *G01S 5/0072* (2013.01)

(58) Field of Classification Search
CPC ...... H04W 72/00; G01S 1/042; G01S 5/0063; G01S 5/0289
See application file for complete search history.

(56) References Cited

U.S. PATENT DOCUMENTS

| | | | |
|---|---|---|---|
| 10,687,352 B2* | 6/2020 | John Wilson | H04W 72/046 |
| 2009/0167513 A1 | 7/2009 | Hill et al. | |
| 2015/0362581 A1 | 12/2015 | Friedman et al. | |
| 2017/0013412 A1 | 1/2017 | Steiner | |
| 2017/0041926 A1* | 2/2017 | Qi | G01S 13/74 |
| 2017/0115372 A1 | 4/2017 | Abinader, Jr. et al. | |
| 2017/0118587 A1 | 4/2017 | Abinader, Jr. et al. | |
| 2017/0118769 A1 | 4/2017 | Abinader, Jr. et al. | |
| 2017/0131383 A1 | 5/2017 | Bartov et al. | |
| 2017/0311264 A1* | 10/2017 | Raghupathy | G01S 5/0221 |
| 2017/0314892 A1* | 11/2017 | Holder | F41G 7/303 |
| 2018/0011179 A1 | 1/2018 | Zhang et al. | |
| 2018/0099643 A1* | 4/2018 | Golsch | G07C 9/00309 |
| 2018/0213492 A1* | 7/2018 | Xia | H04W 56/006 |
| 2018/0376356 A1 | 12/2018 | Qi et al. | |
| 2019/0124690 A1* | 4/2019 | Siomina | H04W 48/16 |
| 2019/0132906 A1 | 5/2019 | Truong et al. | |
| 2019/0208387 A1 | 7/2019 | Jiang et al. | |
| 2019/0208483 A1 | 7/2019 | Luecke | |
| 2019/0253991 A1 | 8/2019 | Marvel | |
| 2020/0022160 A1* | 1/2020 | Zou | H04W 72/1242 |
| 2020/0092850 A1* | 3/2020 | Jiang | H04W 64/00 |
| 2020/0256975 A1* | 8/2020 | Chu | H04W 40/02 |
| 2020/0358474 A1* | 11/2020 | Nabki | H04B 1/7183 |

OTHER PUBLICATIONS

Decawave: "DWM1001 System Overviewand Performance", Dec. 18, 2017 (Dec. 18, 2017), p. 142, XP055575380, Dublin, Retrieved from the Internet:URL:https://www.decawave.com/sites/default/files/dwm1001_system_overview.pdf [retrieved on Mar. 28, 2019], Sections: 1.3, 4.1, 4.6, 9 1.1, 9 .1.10, 9.1.11, 9 .1.12.

Hoang G.M., et al., "Cooperative Localization in GNSS-Aided VANETs with Accurate IR-UWB Range Measurements", 2016 13TH Workshop on Positioning, Navigation and Communications (WPNC), IEEE, Oct. 19, 2016 (Oct. 19, 2016), pp. 1-6, XP033046093, DOI: 10.1109/WPNC.2016.7822848 [retrieved on Jan. 17, 2017], Section I.

International Search Report and Written Opinion—PCT/US2018/067145—ISA/EPO—dated Apr. 11, 2019.

Niesen U.,et al., "Inter-Vehicle Range Estimation from Periodic Broadcasts", Dec. 7, 2015 (Dec. 7, 2015), XP055409338, 16 Pages, Retrieved from the Internet:URL:https://arxiv.org/pdf/1512.02059.pdf, Section: I .A, I .B, II, III.A, III.C.

* cited by examiner

SYSTEM AND METHOD FOR RANGING-ASSISTED VEHICLE POSITIONING

PRIORITY CLAIM

This application is a continuation of U.S. patent application Ser. No. 16/228,051, filed Dec. 20, 2018, which claims priority to and the benefit of provisional patent application No. 62/611,182, filed in the United States Patent Office on Dec. 28, 2017, the entire content of each application is incorporated herein by reference as if fully set forth below in its entirety and for all applicable purposes.

TECHNICAL FIELD

The technology discussed below relates generally to wireless communication systems, and more particularly, to ranging-assisted positioning of vehicles in vehicle-to-vehicle communications.

BACKGROUND

Wireless communication devices, sometimes referred to as user equipment (UE), may communicate with a base station or may communicate directly with another UE. When a UE communicates directly with another UE, the communication is referred to as device-to-device (D2D) communication. In particular use cases, a UE may be a wireless communication device, such as a portable cellular device, or may be a vehicle, such as an automobile, a drone, or may be any other connected devices. When the UE is a vehicle, such as an automobile, the D2D communication may be referred to as vehicle-to-vehicle (V2V) communication. Other vehicle-based communications may include vehicle-to-everything (V2X), which may include V2V, vehicle-to-infrastructure (V2I), vehicle-to-network (V2N), and vehicle-to-pedestrian (V2P). Vehicle-to-everything communication and particularly, V2V communication may be used in various applications, for example, collision avoidance and autonomous driving.

BRIEF SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the disclosure provides a first user equipment (UE) for wireless communication. The first UE includes a transceiver configured for performing ranging using a ranging period including a first control period, a ranging cycle, and a second control period. The first UE further includes a memory and a processor operatively coupled with the transceiver and the memory. The processor and the memory are configured to transmit, via the transceiver, a first slot ID in the first control period, to indicate a first time slot for transmitting a first ranging signal in the ranging cycle. The ranging cycle includes a plurality of time slots including the first time slot and a second time slot. The processor and the memory are further configured to transmit, via the transceiver, the first ranging signal in the first time slot in the ranging cycle. The processor and the memory are further configured to receive, from a second UE via the transceiver, a second ranging signal in the second time slot that is different from the first time slot. The processor and the memory are further configured to determine a first time-of-arrival (ToA) of the second ranging signal when received by the first UE and transmit, via the transceiver, the first ToA in the second control period after the ranging cycle.

Another aspect of the disclosure provides a first user equipment (UE) for wireless communication. The UE includes a transceiver configured for performing ranging among a plurality of UEs, a memory, and a processor operatively coupled with the transceiver and the memory. The processor and the memory are configured to determine an allocation of a plurality of time slots of a ranging cycle. Each of the UEs is allocated to one or more of the plurality of time slots for transmitting a ranging signal. The processor and the memory are further configured to transmit, via the transceiver, a first ranging signal in a time slot allocated to the first UE. The processor and the memory are further configured to receive, from a second UE via the transceiver, a second ranging signal in a time slot allocated to the second UE. The processor and the memory are further configured to receive, from the second UE via the transceiver, a first time-of-arrival (ToA) of the first ranging signal when received by the second UE. The processor and the memory are further configured to determine a second ToA of the second ranging signal when received from the first UE. The processor and the memory are further configured to determine a distance between the first UE and second UE based on the first ToA and the second ToA.

Another aspect of the disclosure provides a method of performing ranging at a first user equipment (UE) during a ranging period that includes a first control period, a ranging cycle, and a second control period. The first UE transmits a first slot ID in the first control period, to indicate a first time slot for transmitting a first ranging signal in the ranging cycle. The ranging cycle includes a plurality of time slots including the first time slot and a second time slot. The first UE transmits the first ranging signal in the first time slot in the ranging cycle. The first UE receives, from a second UE, a second ranging signal in the second time slot that is different from the first time slot. The first UE determines a first time-of-arrival (ToA) of the second ranging signal when received by the first UE. Then the first UE transmits the first ToA in the second control period after the ranging cycle.

Another aspect of the disclosure provides a method of performing ranging among a plurality of UEs including a first UE and a second UE. The first UE determines an allocation of a plurality of time slots of a ranging cycle. Each of the UEs is allocated to one or more of the plurality of time slots for transmitting a ranging signal. The first UE transmits a first ranging signal in a time slot allocated to the first UE. The first UE receives, from the second UE, a second ranging signal in a time slot allocated to the second UE. The first UE receives, from the second UE, a first time-of-arrival (ToA) of the first ranging signal when received by the second UE. The first UE determines a second ToA of the second ranging signal when received by the first UE. Then, the UE determines a distance between the first UE and second UE based on the first ToA and the second ToA.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Aspects of the present disclosure are directed to device-to-device (D2D) and, more particularly, vehicle-to-vehicle (V2V) communication using a ranging protocol that provides efficient ranging-assisted vehicle positioning. Accurate vehicle location determination and positioning has many potential applications, for example, in collision avoidance and autonomous driving. Various satellite-based location determination and positioning methods may be used to determine a vehicle's location. Some exemplary Global Navigation Satellite Systems (GNSS) are Global Positioning System (GPS), Galileo, GLONASS, BeiDou, etc. A GNSS system that uses code phase positioning may provide an accuracy of about 2 to 3 meters. A GNSS system that uses carrier phase positioning may achieve sub-meter accuracy. However, carrier phase positioning may need a long time period to calculate a fix on the position, so it may be difficult to achieve the accuracy needed in a short duration needed in collision avoidance and autonomous driving applications. Sub-meter accuracy may also be achieved with hybrid positioning using a combination of GNSS, wireless wide area network, wireless local area network, and vision-based positioning. However, hybrid positioning may use additional infrastructure and/or a planned route with additional information for positioning (e.g., crowdsourced or war driven data points along the route, etc.)

To improve the accuracy of vehicle location determination to the order of centimeters or better, for example, low-centimeter ranges of one or less than one centimeter (cm) to a few centimeters, relative positioning techniques may be used. Ranging is a relative positioning technique that can determine a distance between and among vehicles and RSUs (road-side units). Vehicles and RSUs may be referred to as "UEs" in this disclosure. In this disclosure, the term "ranging" refers to measuring and/or determining the distances between pairs of UEs or pairs of antennas on respective UEs. The measured distances can be combined with known positions of other UEs (e.g., satellite-based positions broadcasted by other UEs) to refine UE position/location estimation.

Figure 1:
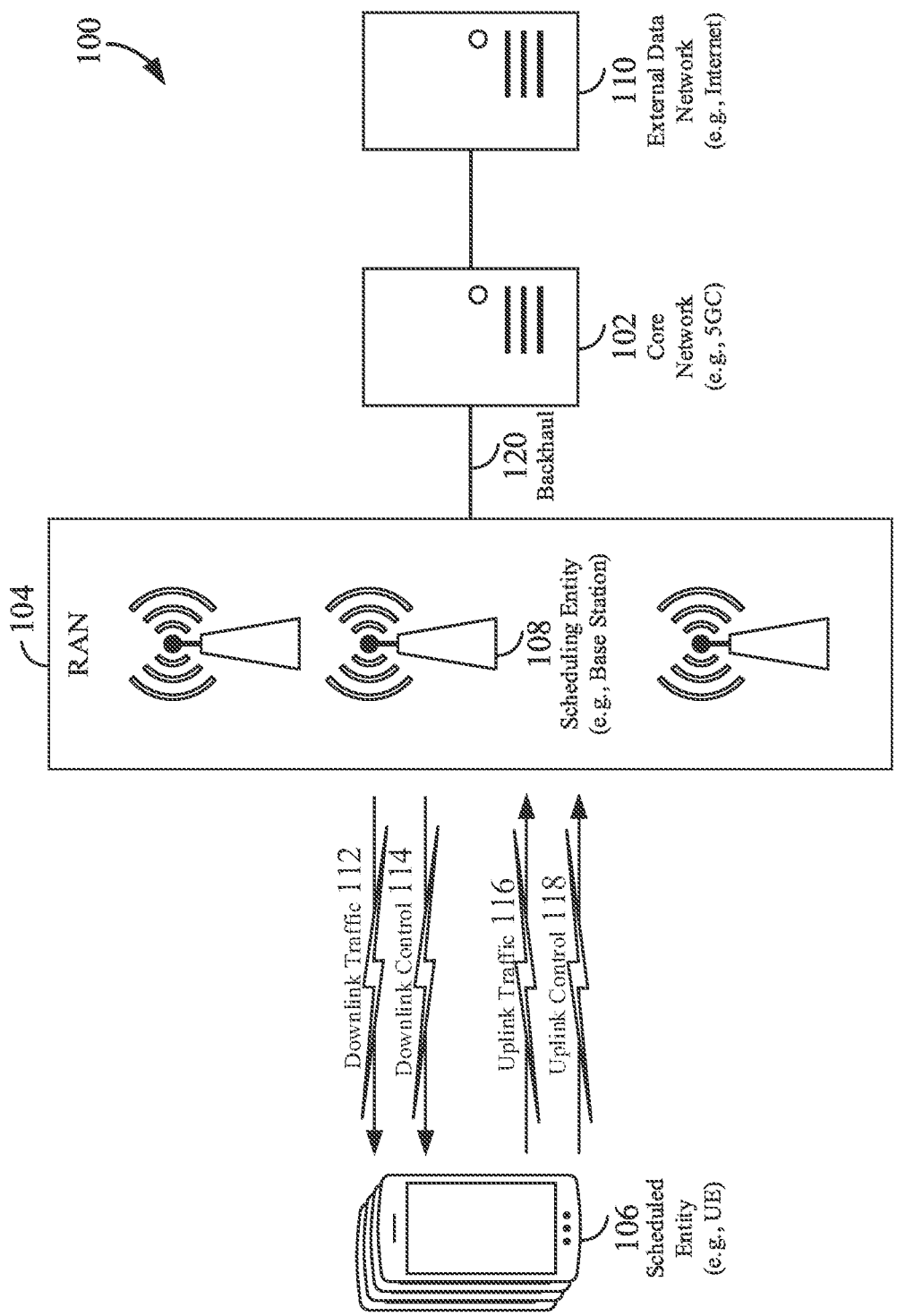
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global navigation satellite system (GNSS) device, an object tracking device, a drone, a multi-copter, a quad-copter, a remote control device, a consumer and/or wearable device, such as eyewear, a wearable camera, a virtual reality device, a smart watch, a health and/or fitness tracker, a digital audio player (e.g., MP3 player), a camera, a game console, smart apparel, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
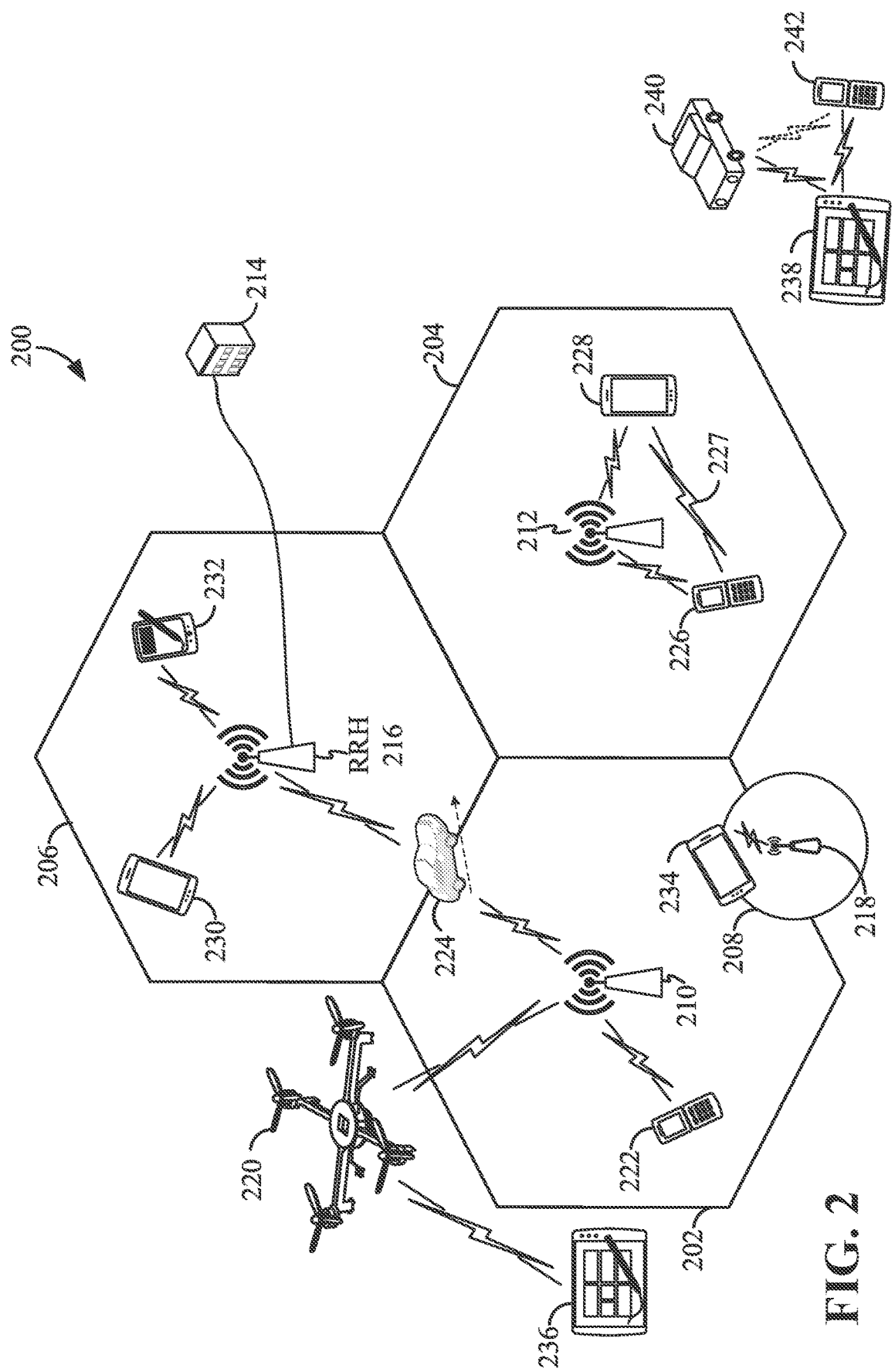
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. In some examples, some of the UEs may be a vehicle or automobile (e.g., UE 224).

In some examples, a mobile network node (e.g., quadcopter 220 or vehicle 224) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE (e.g., vehicle 240) to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data may be coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

V2X Communication Network

Figure 3:
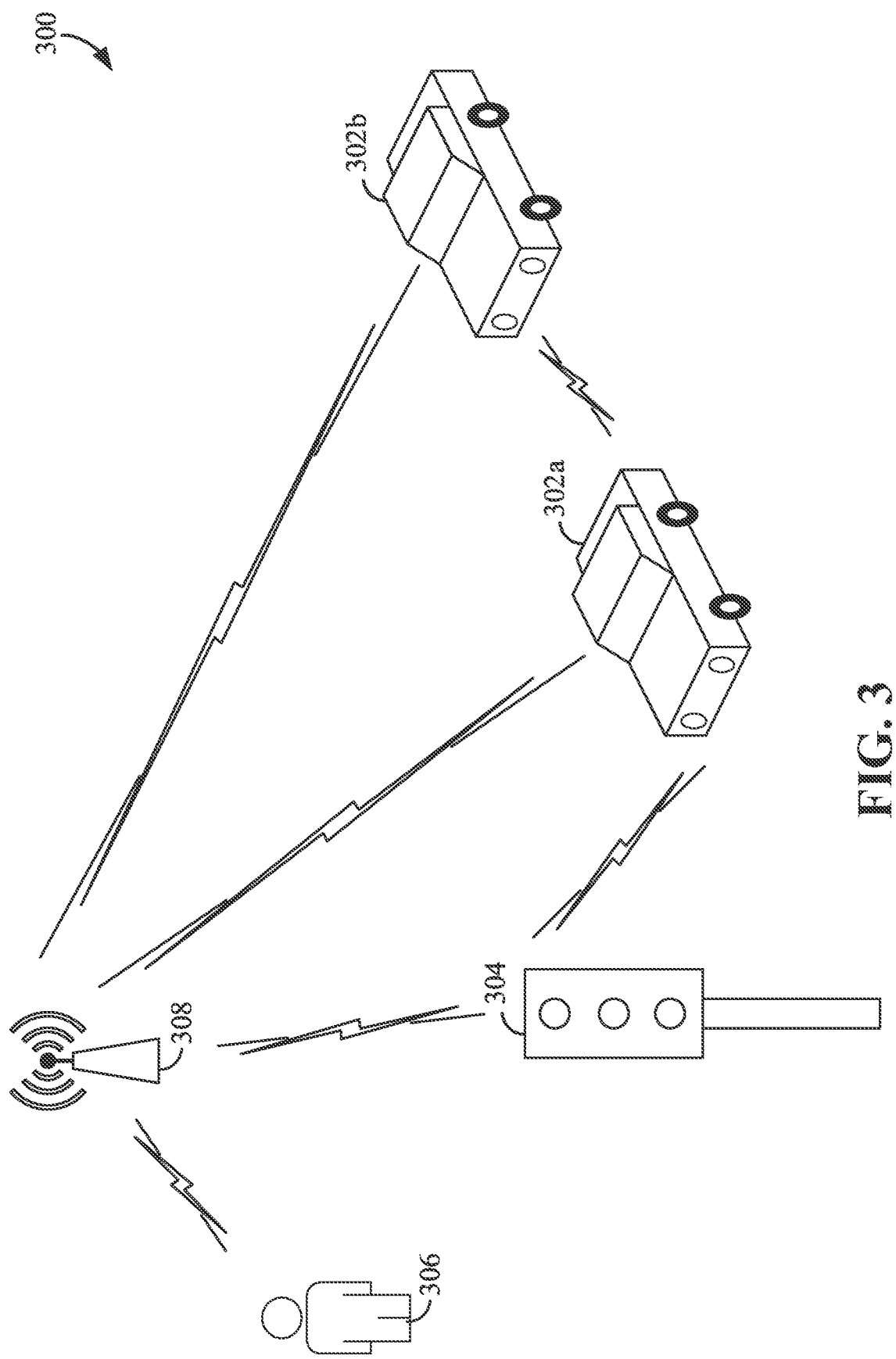
FIG. 3 is a schematic illustration of an exemplary vehicle-to-everything (V2X) wireless communication network.

FIG. 3 illustrates an exemplary vehicle-to-everything (V2X) communication network 300. A V2X network can connect vehicles 302*a* and 302*b* to each other (vehicle-to-vehicle (V2V)), to roadside infrastructure 304 (vehicle-to-infrastructure (V2I)), to pedestrians 306 (vehicle-to-pedestrian (V2P)), and/or to the network/base station 308 (vehicle-to-network (V2N)). The network 300 may be a part of the network 200 described in relation to FIG. 2. In some aspects of the disclosure, a vehicle may be a self-powered vehicle (e.g., electric or gas powered). In some aspects of the disclosure, a vehicle may be a manually powered vehicle (e.g., a bicycle). In some aspects of the disclosure, a vehicle may be autonomous, semi-autonomous, or manually operated.

A V2I transmission may be between a vehicle (e.g., vehicle 302*a*) and a roadside unit (RSU) 304, which may be coupled to various infrastructures, such as a traffic light, building, streetlight, traffic camera, tollbooth, or other stationary object. In some examples, the RSU 304 may act as a base station enabling communication between vehicles 302a and 302b, between vehicles 302a/302b and the RSU 304, and between vehicles 302a/302b and mobile devices 306 of pedestrians. The RSU 304 may further exchange V2X data gathered from the surrounding environment, such as a connected traffic camera or traffic light controller, V2X connected vehicles 302a/302b, and mobile devices 306 of pedestrians, with other RSUs 304 and distribute that V2X data to V2X connected vehicles 302a/302b and pedestrians 306. Examples of V2X data may include status information (e.g., position, speed, acceleration, trajectory, etc.) or event information (e.g., traffic jam, icy road, fog, pedestrian crossing the road, collision, etc.), and may also include video data captured by a camera on a vehicle or coupled to an RSU 304.

Such V2X data may enable autonomous driving and improve road safety and traffic efficiency. For example, the exchanged V2X data or messages may be utilized by a V2X connected vehicle 302a/302b to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. V2X (e.g., V2V) communication may be used for ranging operations between UEs to determine a distance between the UEs. In addition, V2X data received by a V2X connected mobile device 306 of a pedestrian may be utilized to trigger a warning sound, vibration, flashing light, etc., in case of imminent danger (e.g., approaching vehicle).

V2N communication may utilize traditional cellular links to provide cloud services to a V2X device (e.g., a vehicle 302a/302b, RSU 304, or pedestrian 306) for latency-tolerant use cases. For example, V2N may enable a V2X network server to broadcast messages (e.g., weather, traffic, or other information) to V2X devices over a wide area network and may enable V2X devices to send unicast messages to the V2X network server. In addition, V2N communication may provide backhaul services for RSUs 304.

Due to the usual high mobility of vehicles, it is desirable to perform ranging operations among vehicles (e.g., vehicles 320a and 302b) in a short period of time to provide a snapshot of a vehicle's position. In one example, when two vehicles travel at 140 km/h on a highway in opposite directions, their absolute positions change by 3.89 meters in 100 milliseconds (ms), and the relative positions of the vehicles traveling in opposite directions changes by 7.78 meters. If the ranging signals are sent in a span of 100 ms, then during that time the positions of the vehicles may have changed by a few meters. This leads to inaccurate or outdated estimation of positions even if the ranging operation is very accurate. Therefore, it is desirable to concentrate the ranging signals that are transmitted within a short period of time.

In some aspects of the disclosure, the ranging signals sent by different vehicles occur very close in time to provide a "snapshot" of the vehicles' position. If ranging signals are transmitted between each pair of UEs among N UEs, then $O(N^2)$ (i.e., order of the magnitude required for the number of ranging signals to be transmitted) ranging signals are needed, which is more than what is considered acceptable given the vehicles' anticipated speed and location change per unit of time. Another challenge for accurate ranging includes time offsets (clock offsets) between the UEs, which needs to be compensated to derive the correct distance between UEs.

Aspects of the present disclosure provide a ranging protocol in which the ranging signals are concentrated in a very short period of time to achieve highly accurate ranging. Ranging in a small time window ensures that any clock drifts of the UEs are small during the window. This can avoid the need for clock drift estimation and simplify the ranging protocol. Moreover, the disclosed ranging protocol may have a low duty cycle to improve efficiency in energy and resource usage.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms and others.

Within the present disclosure, a frame refers to a predetermined duration (e.g., 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. For example, in a multiple-input multiple-output (MIMO) implementation with multiple antenna ports available, a corresponding multiple numbers of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408.

Further, in this illustration, the RB 408 is shown as occupying less than the entire duration of the subframe 402, although this is merely one possible example.

Each subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
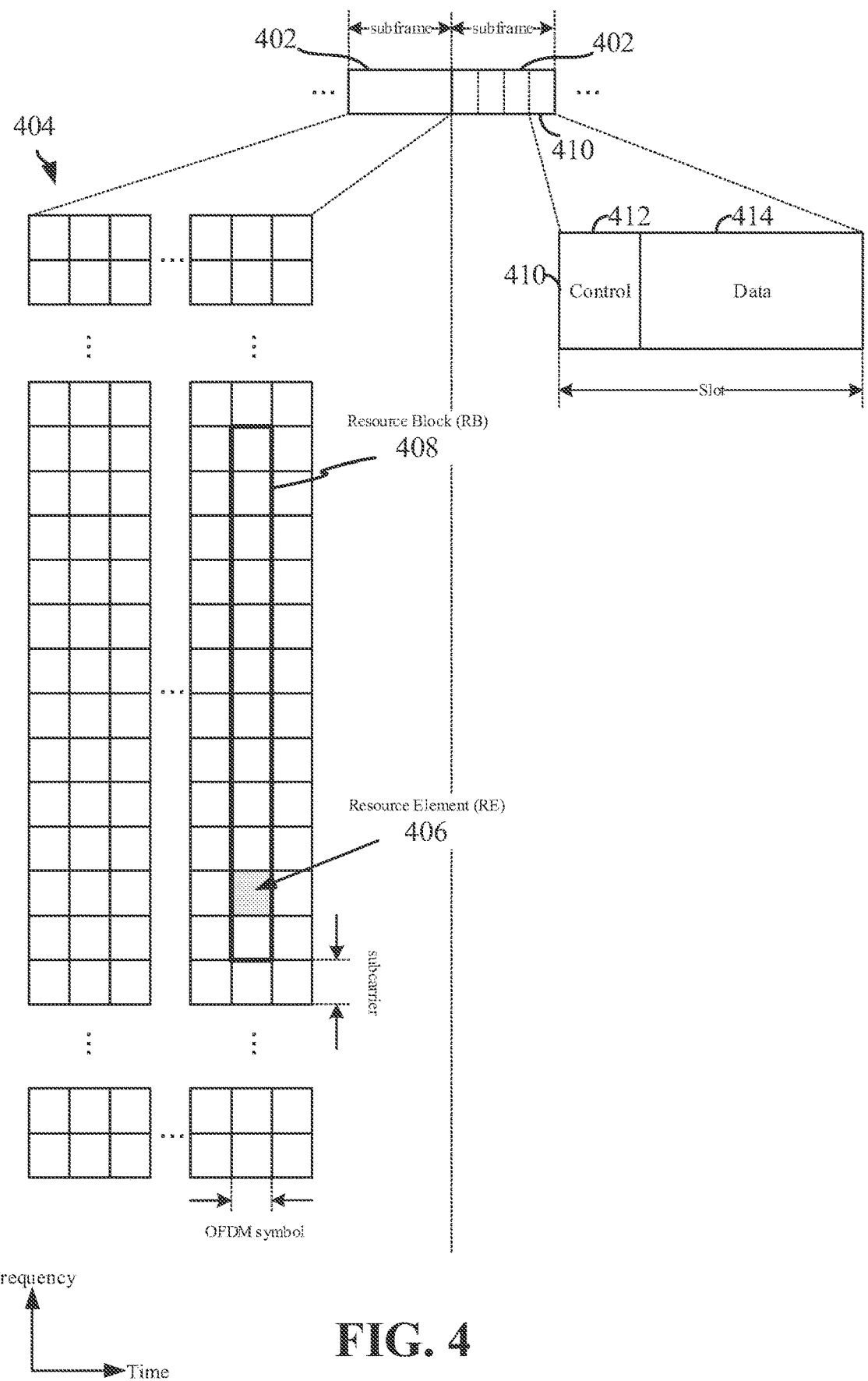
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), a sounding reference signal (SRS), or a positioning reference signal (PRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the scheduled entity 106) may utilize one or more REs 406 to carry UL control information 118 originating from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some aspects of the disclosure, some REs 406 may be allocated for V2X communication, for example, ranging operations.

The channels or carriers described above are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
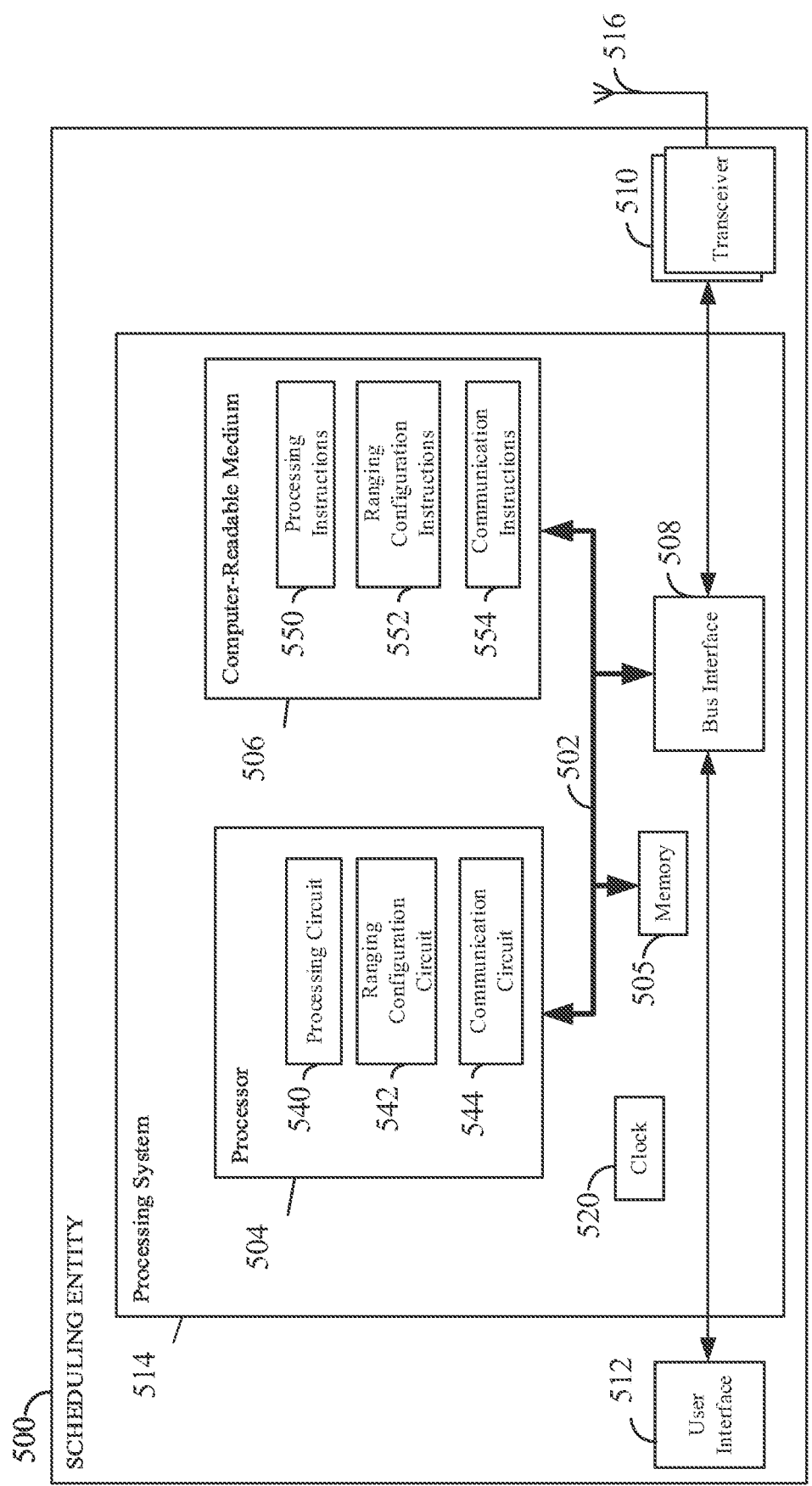
FIG. 5 is a block diagram conceptually illustrating an example of a hardware implementation for a scheduling entity according to some aspects of the disclosure.

FIG. 5 is a block diagram illustrating an example of a hardware implementation for a scheduling entity 500 employing a processing system 514. For example, the scheduling entity 500 may be a user equipment (UE) or vehicle as illustrated in any one or more of FIGS. 1, 2, 3, 7, 8 and/or 11. In another example, the scheduling entity 500 may be a base station as illustrated in any one or more of FIGS. 1, 2, 3, 7, 8, and/or 11.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes and procedures described below and illustrated in FIGS. 7-17.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and may be omitted in some examples, such as a base station.

In some aspects of the disclosure, the processor 504 may include circuitry (e.g., a processing circuit 540, a ranging configuration circuit 542, and a communication circuit 544) configured to implement one or more of the functions described below in relation to FIGS. 7-17. The processing circuit 540 may be configured to perform various data processing functions used in wireless communication. The ranging configuration circuit 542 may be configured to determine, allocate, and schedule radio and network resources for use in ranging operations in a V2X network. In one example, the ranging configuration circuit 542 may allocate various radio resources to ranging operations in a V2X network 300. The communication circuit 544 may be configured to perform various wireless communication functions using the transceiver 510 and an antenna 516.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software or code. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed, read, and executed by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include software or executable code (e.g., processing instructions 550, ranging configuration instructions 552, and communication instructions 554) configured for various functions. For example, the software may be configured to implement one or more of the ranging functions described in relation to FIGS. 7-17. The processing instructions 550 may configure the processor 504 to perform various data processing functions used in wireless communication. The ranging configuration instructions 552 may configure the processor 504 to determine, allocate, and schedule radio and network resources for use in ranging operations in a V2X network. The communication instructions 554 may configure the processor 504 to perform various wireless communication functions using the transceiver 510.

Figure 6:
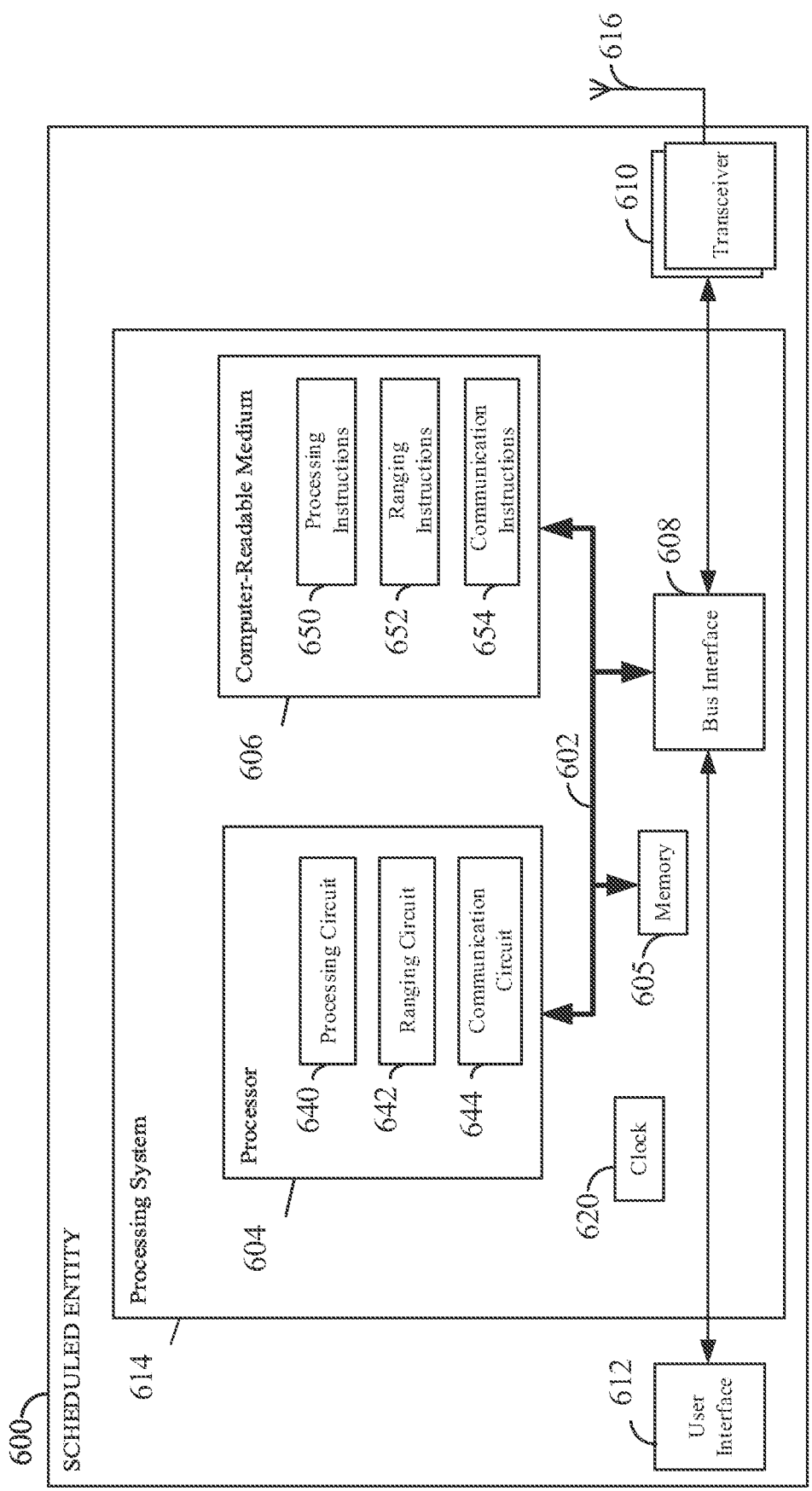
FIG. 6 is a block diagram conceptually illustrating an example of a hardware implementation for a scheduled entity according to some aspects of the disclosure.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a user equipment (UE) or vehicle as illustrated in any one or more of FIGS. 1, 2, 3, 7, 8, and/or 11.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below and illustrated in FIGS. 7-17.

In some aspects of the disclosure, the processor 604 may include circuitry (e.g., a processing circuit 640, a ranging circuit 642, and a communication circuit 644) configured to implement one or more of the ranging functions described below in relation to FIGS. 7-17. The processing circuit 640 may be configured to perform various data processing functions used in wireless communication. The ranging circuit 642 may be configured to perform various functions used in ranging operations in a V2X network. In one example, the ranging circuit 642 may be configured to transmit and receive ranging signals via the transceiver 610 and an antenna 616, and determine time-of-arrival (ToA) of received ranging signals based on a local clock 620. In one example, the transceiver 610 may receive, via the antenna 616, a message (e.g., ranging signal) from another vehicle. The transceiver 610 or the communication circuit 644 may convert the message to the baseband that may be processed by the processing circuit 640 (e.g., an application processor and/or a sensor processor) to determine the ToA. The communication circuit 644 may be configured to perform various wireless communication functions using the transceiver 610. The transceiver 610 supports wireless communication using unlicensed or licensed UWB and/or narrowband signals.

Some of the UEs described above in FIGS. 1, 2, and 3 may be vehicles that can communicate with each other using V2V or D2D communication. Future generations of vehicles capable of autonomous driving or operation will demand collision avoidance capability that uses high accuracy (e.g., centimeter-level accuracy) in vehicle positioning and ranging. Aspects of the present disclosure provide a ranging procedure that enables ranging with high accuracy (e.g., in low-centimeter ranges).

Figure 7:
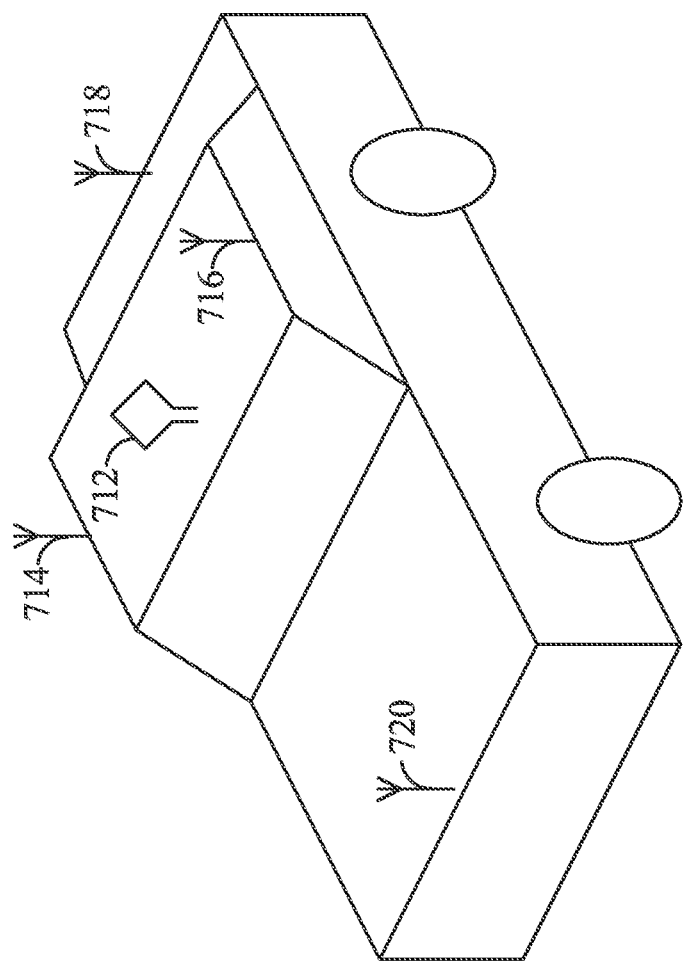
FIG. 7 is a diagram illustrating a vehicle capable of device-to-device communications according to some aspects of the disclosure.

FIG. 7 is a schematic diagram illustrating a vehicle 700 capable of device-to-device communications, in accordance with some aspects of the present disclosure. In one example, the vehicle 700 can be one of the UEs described in relation to FIGS. 1, 2, and/or 3. The vehicle 700 may have a positioning antenna 712, and one or more radio frequency (RF) antennas. For example, the vehicle 700 may have four RF antennas 714, 716, 718, and 720, configured to perform vehicle-to-vehicle (V2V) ranging, vehicle-to-everything (V2X) ranging, and/or other wireless communication operations. In other examples, the vehicle 700 may have more or fewer RF antennas. In one aspect of the disclosure, the RF antennas 714, 716, 718, and 720, may be located at generally the periphery or edges of the vehicle 700. For example, first and second RF antennas 714 and 716 may be located on the roof of the vehicle 700. A third RF antenna 720 may be located at the front of the vehicle 700. A fourth RF antenna 718 may be located at the rear of the vehicle 700. The positioning antenna 712 may be in operative communication with one or more navigation satellites (e.g., GNSS satellites). The vehicle 700 may use the RF antennas 714, 716, 718, and 720 to communicate with one or more base stations (for example, one or more eNBs or gNBs as shown in FIGS. 1, 2, and/or 3), or one or more UEs.

Figure 8:
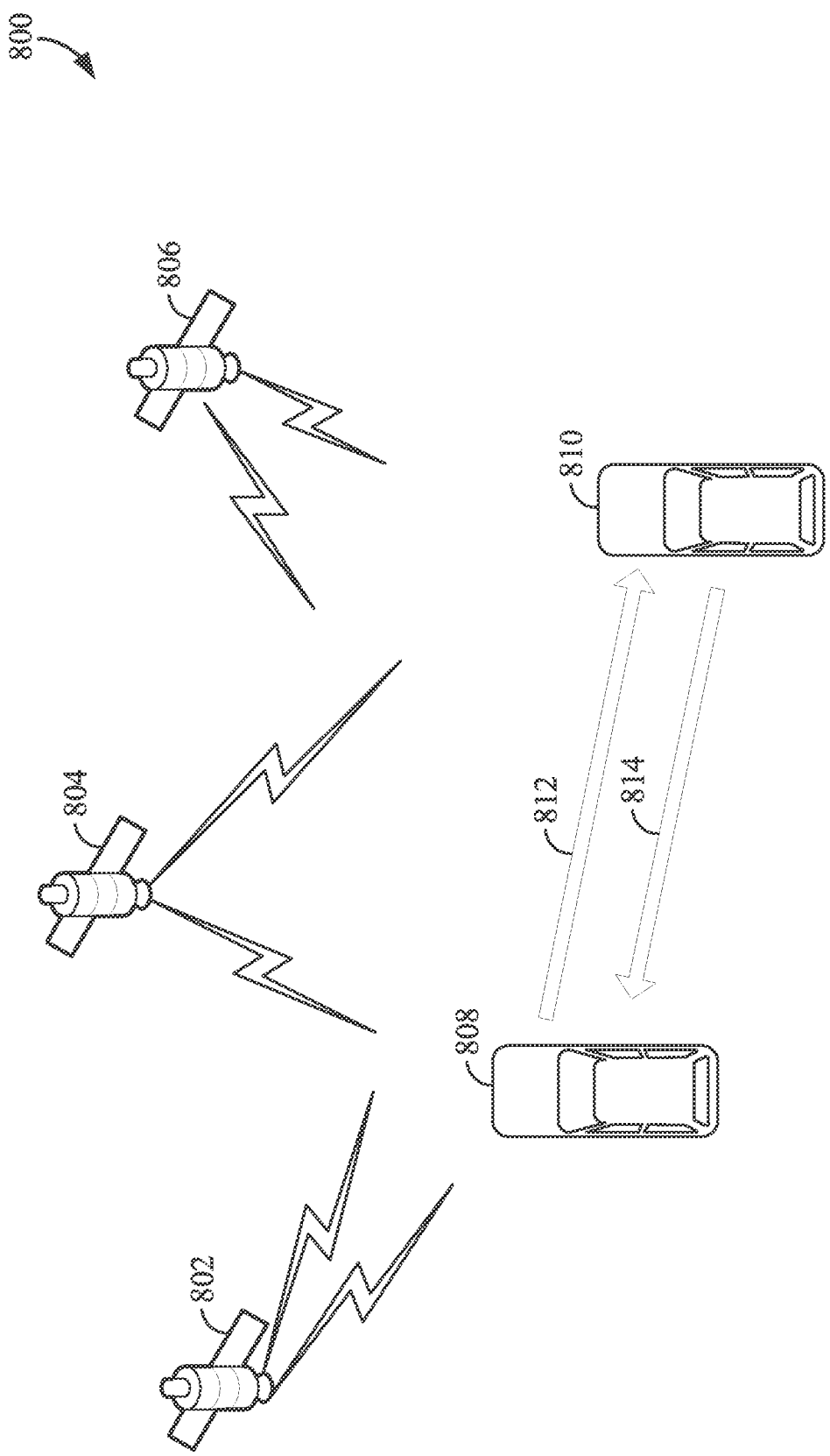
FIG. 8 is a diagram illustrating a positioning and ranging system according to some aspects of the disclosure.

FIG. 8 is a schematic diagram illustrating a positioning and ranging system 800, in accordance with various aspects of the present disclosure. Two exemplary vehicles (e.g., a first vehicle 808 and a second vehicle 810) are in communication with navigation satellites 802, 804, and 806 that can provide the vehicles with satellite positioning signals. The first vehicle 808 and second vehicle 810 may be any of the UEs illustrated in FIGS. 1, 2, and/or 3. Although only two vehicles are shown in FIG. 8, it should be understood that there may be more or fewer vehicles in other examples. The vehicles 808 and 810 are not limited to using satellite positioning. In some aspects of the disclosure, the vehicles may derive their positions from wireless wide area network (WWAN) signals (e.g., signals from base stations, RSU), visual-based positioning, wireless local area network (WLAN) signals (e.g., Wi-Fi, Bluetooth), sensor-based positioning, or any combination thereof.

The first vehicle 808 may be equipped with a positioning antenna, and one or more RF antennas like the vehicle 700 described above in relation to FIG. 7. The vehicle may use the positioning antenna to receive signals such as satellite signals, WWAN signals, WLAN signals, or a combination thereof. In one example, the RF antennas may be located at the periphery or edges of the vehicle. Similarly, the second vehicle 810 may be equipped with a positioning antenna, and one or more RF antennas like the vehicle 700 shown in FIG. 7.

In one aspect of the disclosure, the first vehicle 808 and the second vehicle 810 are in operative communication with the navigation satellites 802, 804, and 806. Although three navigation satellites are shown in FIG. 8, more or fewer navigation satellites may be in operative communication with the first vehicle 808 and the second vehicle 810 via their respective positioning antennas. Each vehicle can determine its satellite-based location based on the signals (e.g., time signals) received from the navigation satellites 802, 804, and 806.

In some aspects of the disclosure, the vehicles may improve the accuracy of their determined locations by using a ranging operation in addition to the satellite signals. In one aspect of the disclosure, the first vehicle 808 may transmit a ranging signal 812 using certain radio parameters (e.g., slot ID) or radio resources. Similarly, the second vehicle 810 may transmit a ranging signal 814 that can be differentiated from the first vehicle's ranging signal 812. In some aspects of the disclosure, the ranging signal may have a large bandwidth (e.g., 500 MHz to 1 GHz) to enable highly accurate ranging measurements. One exemplary large bandwidth signal is an ultra-wideband (UWB) signal. In general, a UWB signal has a low emission level that does not interfere with narrowband and carrier wave (e.g., cellular carriers) transmissions in the same or overlapped frequency band. In some examples, a ranging signal may include a plurality of separate UWB signal pulses sent over a large bandwidth (e.g., greater than 500 MHz). The radio parameters or radio resources of the ranging signals may be scheduled, allocated, or assigned by a base station (e.g., eNB or gNB) illustrated in FIGS. 1, 2, and/or 3, or any scheduling entity. The first vehicle 808 may use one or more RF antennas (e.g., antennas 714, 716, 718, and 720 shown in FIG. 7) to receive the ranging signal 814 transmitted by the second vehicle 810. Similarly, the second vehicle 810 may use one or more RF antennas (e.g., antennas 714, 716, 718, and 720 shown in FIG. 7) to receive the ranging signal 812 transmitted by the first vehicle 808.

In one aspect of the disclosure, the first vehicle 808 performs a ranging operation based on the ranging signal 814 from the second vehicle 810. Similarly, the second vehicle 810 performs a ranging operation based on the ranging signal 812 from the first vehicle 808. In one aspect of the disclosure, the ranging measurements may be obtained using the techniques described in connection with FIGS. 9-13 below. Although illustrated as automobiles, the vehicles 808 and 810 may be other types of vehicles, for example, a drone, a manned or an unmanned aerial vehicle, a remote-controlled vehicle, or any other UE or object.

Figure 9:
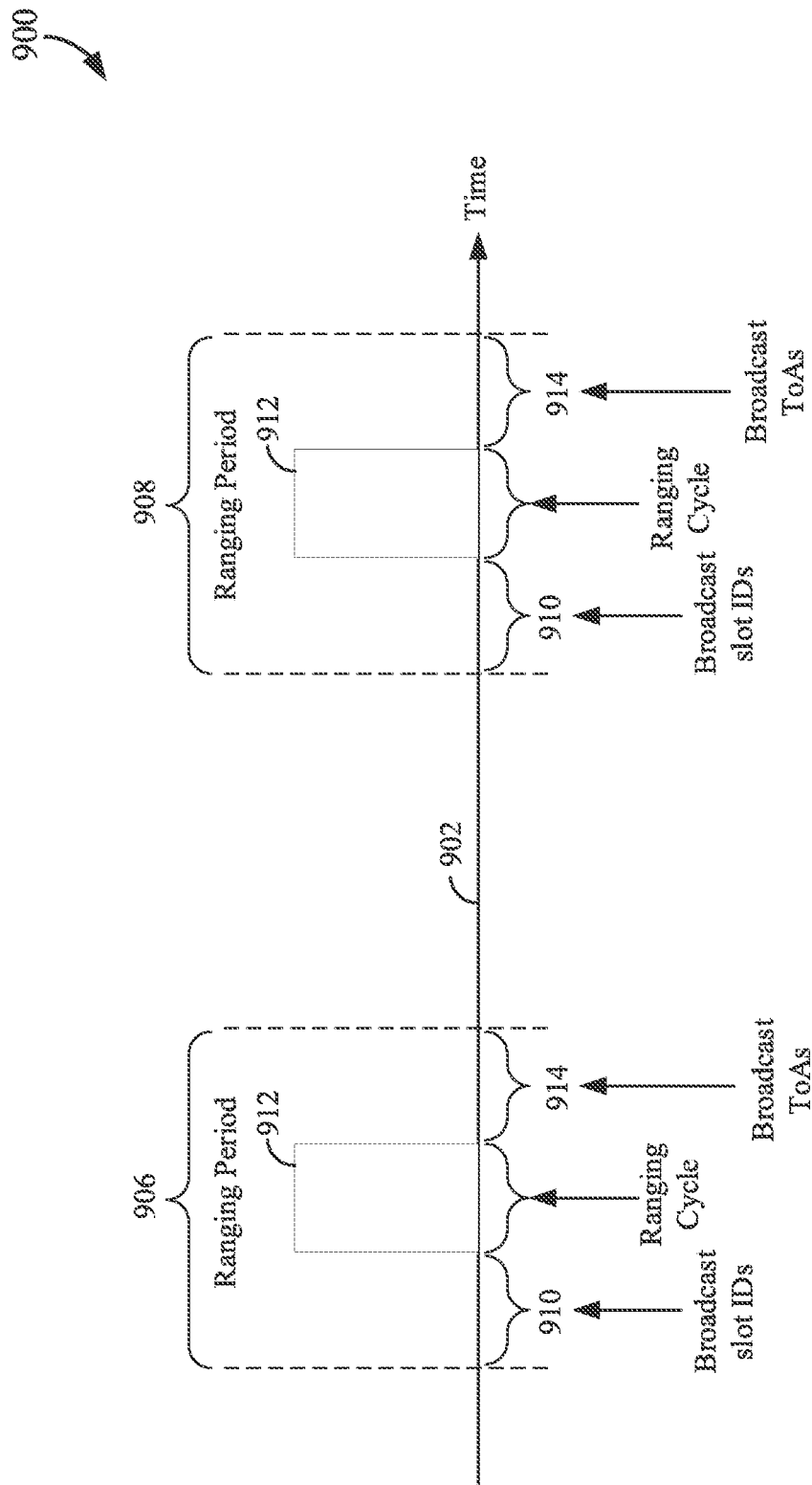
FIG. 9 is a diagram illustrating a communication timeline of a ranging protocol according to some aspects of the disclosure.

FIG. 9 is a schematic diagram illustrating a communication timeline of a ranging protocol 900 in accordance with some aspects of the disclosure. In some examples, this ranging protocol 900 may be used by the vehicles shown in FIG. 8 to determine a distance between the vehicles. The figure in FIG. 9 illustrates a horizontal axis 902 showing time increasing in the right direction. The timeline shows a first communication period 906 and a second communication period 908. Each communication period 906 or 908 may be called a ranging period or measurement period in this disclosure. In one aspect of the disclosure, a ranging period may have a duration of about 50 milliseconds. In some examples, the ranging period may repeat every 1 or 2 seconds. In other examples, the ranging periods may have other durations and/or cycles.

In some aspects of the disclosure, each ranging period includes a first period 910, a second period 912 following the first period, and a third period 914 following the second period. During the first period 910 (a first control period), a UE (e.g., vehicle 808) may broadcast its slot ID(s) for ranging operations. During the second period 912, the UE may be in a ranging cycle and transmits one or more ranging signals (e.g., ranging signals 812 and 814) in a slot(s) associated with the slot ID(s) broadcasted in the first period 910. During the third period 914 (a second control period), the UE may broadcast ranging information or measurements, for example, time-of-arrival (ToA) information, system delay information (e.g., transmit (TX) and receive (RX) delay), etc. In one aspect of the disclosure, the UE may broadcast the slot ID(s) and ranging information/measurements using one or more control periods in the spectrum of a cellular network such as LTE or 5G NR networks.

In some aspects of the disclosure, the UE may transmit ranging signals using a large bandwidth (e.g., between 500 MHz and 1 GHz) with a low power spectral density. In one example, the ranging signals may be UWB signals. In a further example, the UE may transmit one or more control signals (e.g., slot IDs and ranging information/measurements) in the control periods (i.e., the first control period 910 and second control period 914) using a bandwidth that may be significantly smaller than that of the ranging signals. The control signal may be a message transmitted using less time and/or frequency resources. For example, the UE may transmit the control signal in the V2X Intelligent Transport System (ITS) spectrum, which may have bandwidth of 10 or 20 MHz at 5.9 GHz spectrum. Using a large or wider bandwidth such as UWB for the ranging signals enables ranging measurements with centimeter or sub-meter accuracy.

Figure 10:
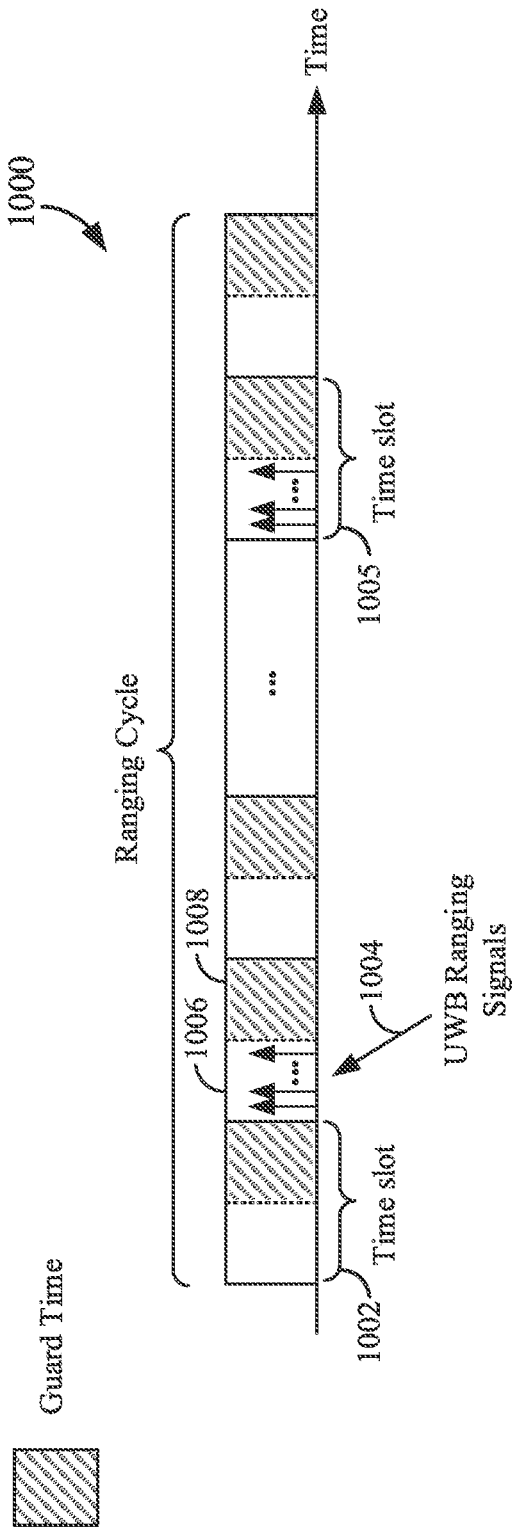
FIG. 10 is a diagram illustrating an exemplary ranging cycle according to some aspects of the disclosure.

FIG. 10 is a schematic diagram illustrating an exemplary ranging cycle 1000 in accordance with some aspects of the disclosure. The ranging cycle 1000 may be used in the ranging protocol 900 described and illustrated in relation to FIG. 9. In some examples, the ranging cycle 1000 may have a duration that is less than three quarters, one half, or one third of a ranging period. In some examples, the ranging cycle 1000 may have a duration that is substantially shorter than a ranging period (e.g., ranging period 906 or 908). In some examples, the ranging cycle 1000 may have a duration that is one-tenth or less of the duration of the ranging period. In one particular example, the ranging cycle 1000 may have a duration of about 5 milliseconds (ms), and a ranging period may have a duration of 50 ms or longer.

Each ranging cycle 1000 includes a plurality of time slots, each associated with a slot ID. Five exemplary time slots (e.g., time slots 1002 and 1005) are shown in FIG. 10. In other examples, a ranging cycle may have more or fewer time slots. In some examples, a time slot may have a duration of about 9 microseconds (μs) or any other suitable duration. Each UE (e.g., UEs 808 and 810 of FIG. 8) may transmit one or more ranging signals 1004 (e.g., UWB pulses) in one or more time slots. In one aspect of the disclosure, the UEs may use different time slots to transmit their respective ranging signals. For example, a first UE may transmit a ranging signal in a first time slot 1002, and a second UE may transmit a ranging signal in a different time slot 1005.

In another aspect, a UE may use no more than a predetermined number (e.g., no more than 2) of time slots in a ranging cycle. In some aspects of the disclosure, a ranging signal 1004 may include UWB pulses that occupy a first portion 1006 of the time slot. In FIG. 10, each UWB pulse is represented by an up arrow in the first portion 1006 of a time slot. In one example, the first portion 1006 may have a duration of about 4 μs, and the UWB pulses may be distributed in the first portion 1006 with a spacing of about 100 nanoseconds (ns) to 200 ns between pulses. In one example, the UWB pulse may have a 500 MHz bandwidth, and each pulse may be about 2 ns in duration. In this case, a UE may transmit 20 to 40 UWB pulses in a time slot. Using a pulse spacing of about 100 ns to 200 ns allows for multipath propagation of each pulse without significant interference between different pulses of the same time slot. For a pair of UEs with line-of-sight (LOS), most energy of the multipath is within 100 ns to 200 ns.

If the UEs do not have completely or substantially synchronized clocks or time reference, the start time of their ranging signal transmissions may not be aligned with the time slot boundary as scheduled by the base station or scheduling entity. The second portion 1008 of each time slot provides a guard time to allow for the misalignment without causing interference among the UEs that use different time slots for their ranging signal transmissions. During the guard time, the UEs do not transmit ranging signals.

During a ranging cycle 1000, when a UE is not transmitting and not in a Tx-to-Rx or Rx-to-Tx transition period, the UE may measure the time-of-arrival (ToA) of the ranging signals (e.g., UWB pulses) transmitted by other UEs in the same or different time slots. For example, after the UE transmitted its ranging signals, the UE can reconfigure its transceiver to receive other UEs ranging signals. The ToAs may be determined with respect to the UE's own clock. In some aspects of the disclosure, the ranging signals (e.g., UWB pulses) from different UEs have the same waveform or use the same time-frequency resources. A receiver can distinguish different UEs' ranging signal transmissions by the time slots used for receiving the ranging signals. In one example, a UE may select (e.g., randomly) the time slot(s) to transmit its ranging signals and signal the time slot assignment to other UEs using the first control period 910 (see FIG. 9) before each ranging cycle. In another example, a scheduling entity may allocate one or more time slot(s) to the UE. If the UE cannot successively receive a ranging signal, the UE may receive the ranging signal in the next ranging cycle.

Figure 11:
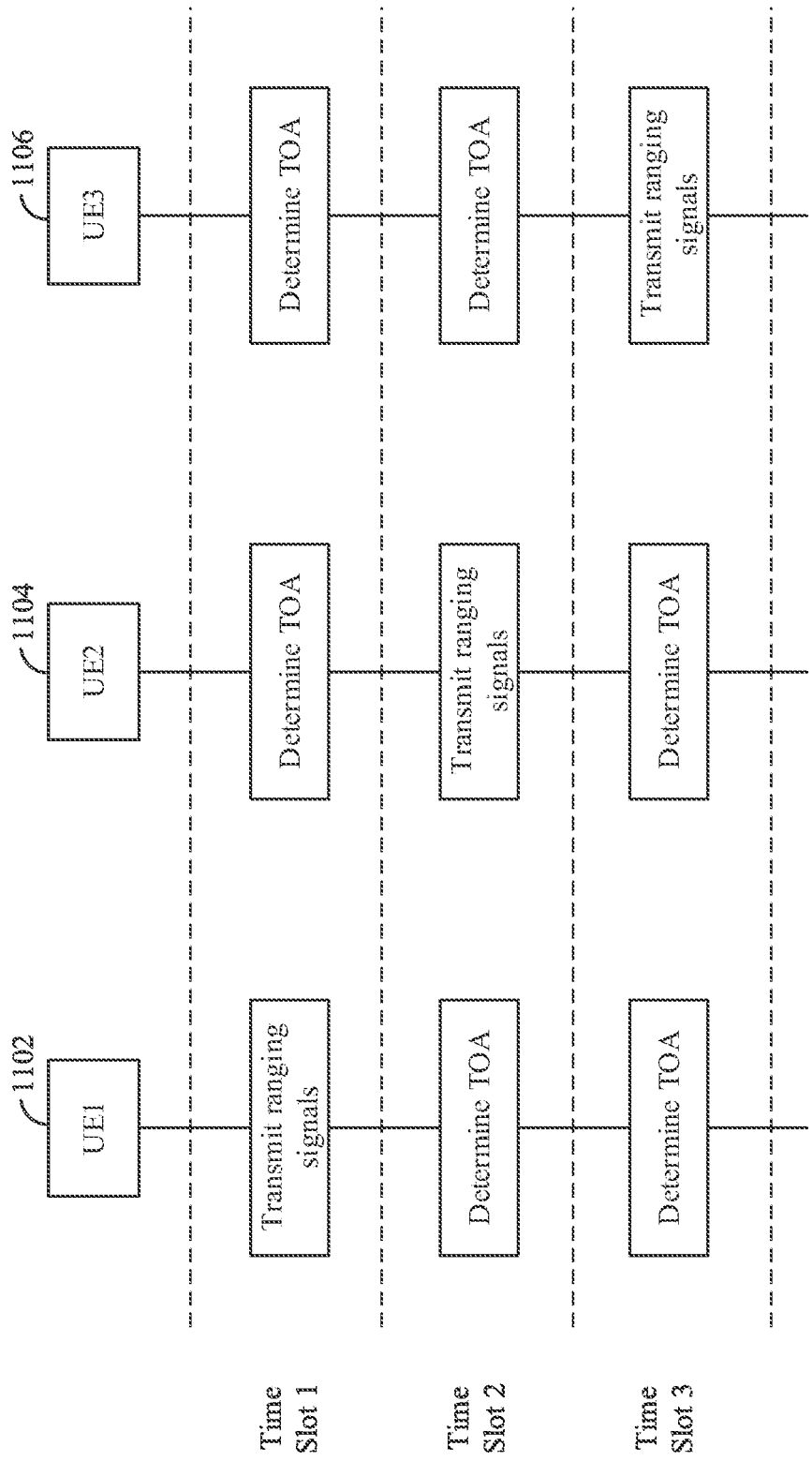
FIG. 11 is a diagram illustrating exemplary ranging signal transmissions during a ranging cycle according to some aspects of the disclosure.

FIG. 11 is a schematic diagram illustrating exemplary ranging signal transmissions during a ranging cycle in accordance with some aspects of the disclosure. Three exemplary time slots of the ranging cycle 1000 are illustrated in FIG. 11. In other examples, the ranging cycle 1000 may have more or fewer time slots. During a first time slot, a first UE 1102 (UE1) transmits its ranging signals, and a second UE 1104 (UE2) and a third UE 1106 (UE3) each determine the TOA of UE1's ranging signals. During a second time slot, UE2 transmits its ranging signals, and UE1 and UE3 each determine the TOA of UE2's ranging signals. During a third time slot, UE3 transmits its ranging signals, and UE1 and UE2 each determine the TOA of UE3's ranging signals.

Figure 12:
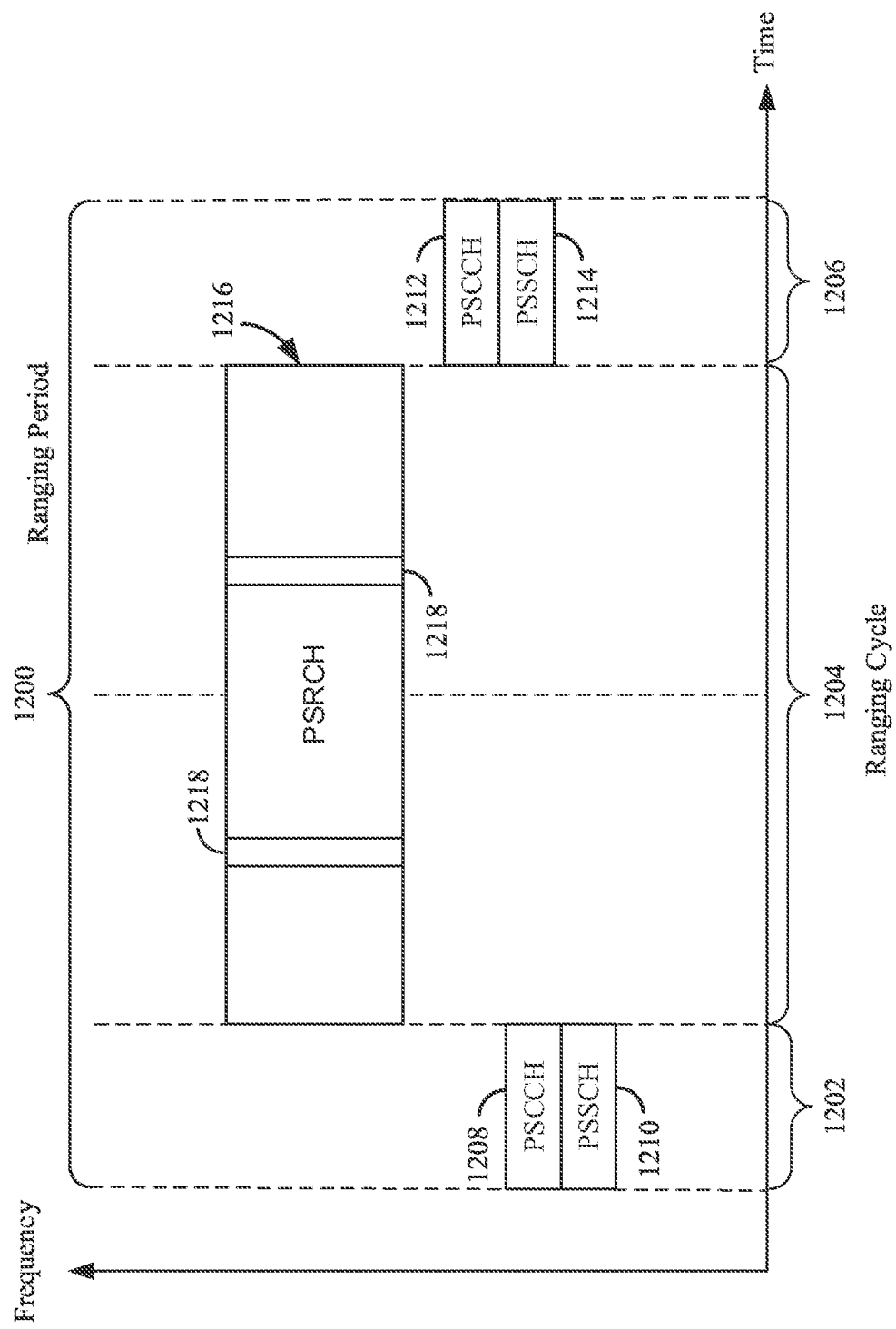
FIG. 12 is a diagram illustrating an exemplary resource allocation for a ranging period according to some aspects of the disclosure.

FIG. 12 is a diagram illustrating a resource allocation example for a ranging period 1200 in accordance with some aspects of the disclosure. The ranging period 1200 may be the same as the communication period 906 or 908 of FIG. 9. In one example, the resource allocated to the ranging period 1200 may include network resources (e.g., time-frequency resources) that can be used for direct vehicle-to-vehicle (V2V) and/or vehicle-to-everything (V2X) communication. In some examples, these resources may be sidelink resources of the RAN 200. A UE (e.g., vehicle) can communicate directly with another vehicle or device via a sidelink. In FIG. 12, the horizontal axis shows a time domain, and the vertical axis shows a frequency domain. A scheduling entity (e.g., eNB, gNB, base station, a vehicle, a server, a traffic light, and/or an RSU) may allocate resources for the ranging period 1200, including sidelink resources.

In some aspects of the disclosure, the ranging period 1200 has a first period 1202, a second period 1204, and a third period 1206 that are similar to the periods 910, 912, and 914 shown in FIG. 9. In the first period 1202 (a first control period), a UE may transmit and/or receive control information using a physical sidelink control channel (PSCCH) 1208 and payload data using a physical sidelink shared channel (PSSCH) 1210. The PSCCH 1208 may contain information about the resource and MCS (modulation and coding scheme) used by the corresponding PSSCH 1210. The scheduling entity may allocate the PSCCH/PSSCH of different UEs to different resources. In some examples, a UE may broadcast its ranging signal slot ID(s) in the PSSCH 1210. The slot ID indicates the slot in the ranging cycle 1204 that is used for transmitting the UE's ranging signal. A base station (e.g., eNB or gNB) may schedule different UEs to use different time and/or frequency resources for their respective PSCCH 1208 and the PSSCH 1210 to transmit their respective information. When a UE is not transmitting in the first period 1202, the UE can receive the slot IDs broadcasted by other UEs.

In the third period 1206 (a second control period), a UE may transmit control information in a PSCCH 1212, during which the UE may broadcast resource information, MCS information, etc. The UE may also transmit data in a corresponding PSSCH 1214. The scheduling entity may allocate the PSCCH/PSSCH of different UEs to different resources. For example, the UE may broadcast its ranging information such as ToA information, transmit (TX) and receive (RX) delay, etc. The ToA information, the TX and RX delay, and other information may be determined by the UE during times when the UE is not transmitting a ranging signal and not in a TX-to-RX or RX-to-TX transition period. A base station may schedule different UEs to use different time and/or frequency resources for the PSCCH 1212 and the PSSCH 1214 to transmit their respective information in the third period 1206. When a UE is not transmitting in the third period 1206, the UE can receive the ToA information and TX/RX delay information broadcasted by other UEs.

In the second period 1204, a UE may transmit a ranging signal (e.g., UWB pulses), for example, in a physical sidelink ranging channel (PSRCH) 1216 in one or more time slot(s) 1218 associated with its time slot ID(s) broadcasted in the first period 1202. That is, different UEs transmit their ranging signals in different and distinct time slots in the PSRCH 1216 during a ranging cycle. A receiver can distinguish the ranging signals from different UEs by the slots in which they are received. In a sense, the ranging signals are time-multiplexed. In some examples, the UEs can send the same UWB pulses (e.g., same frequency, bandwidth, and power) as the ranging signals in different time slots. In some examples, the scheduling entity or base station may allocate the PSRCH 1216 to different frequency resources (e.g., subcarriers) in different time slots.

Although the PSCCH, PSSCH, and PSRCH communications are illustrated as filling specific radio resources in FIG. 12, it is understood that the PSCCH, PSSCH, and PSRCH communications can utilize other radio resource allocation schemes. In some aspects of the disclosure, a UE can use a cellular or licensed spectrum (e.g., LTE and 5G NR spectrum) for the PSCCH and PSSCH in the first period 1202 and third period 1206, and a UWB spectrum or unlicensed spectrum for the PSRCH 1216.

During the ranging cycle 1206, when a UE is not transmitting and not in a TX-to-RX or RX-to-TX transition period, the UE may attempt to determine the ToA of the ranging signals from other UEs. The UE may measure the ToAs with respect to the UE's own local clock or time reference.

In some aspects of the disclosure, a first UE (e.g., UE 808 of FIG. 8) may transmit (e.g., broadcast) ToA information and TX/RX delay information in the third period 1206 to allow at least one second UE (e.g., UE 810 of FIG. 8), to cancel the clock or time offset between the UEs and allow the second UE to determine the distance between the UEs. However, in some scenarios, the second UE may not be interested in the distance between the UEs. Therefore, in such a scenario, the first UE may not need to transmit ToA information in the third period 1206. An example is V2I (Vehicle-to-Infrastructure) ranging, where a UE (e.g., a vehicle) attempts to estimate the distances from a number of RSUs (roadside units) with known positions (e.g., GNSS positions), and subsequently estimates its own position. In this example, only the RSUs transmit information (e.g., ToA and/or TX/RX delays) in the third period 1206. A vehicle can estimate its distance from an RSU after receiving the ToA and optionally TX/RX delay information from the RSU.

In one example, the UE can receive ranging information from at least three RSUs with known positions to determine the position of the UE. In another example, the UE may receive ranging information and precise positions (e.g., sub-meter accuracy) of three or more other vehicles to determine a position of the UE. In this example, the other vehicles may determine their precise positions using a combination of visual positioning, carrier phase GNSS positioning, etc. In some examples, even if a precise position is not known for nearby vehicles, the UE can differentiate where another vehicle is relative (e.g., the vehicle is in front or behind the UE, etc.) to the UE using other techniques such as doppler effects.

Figure 13:
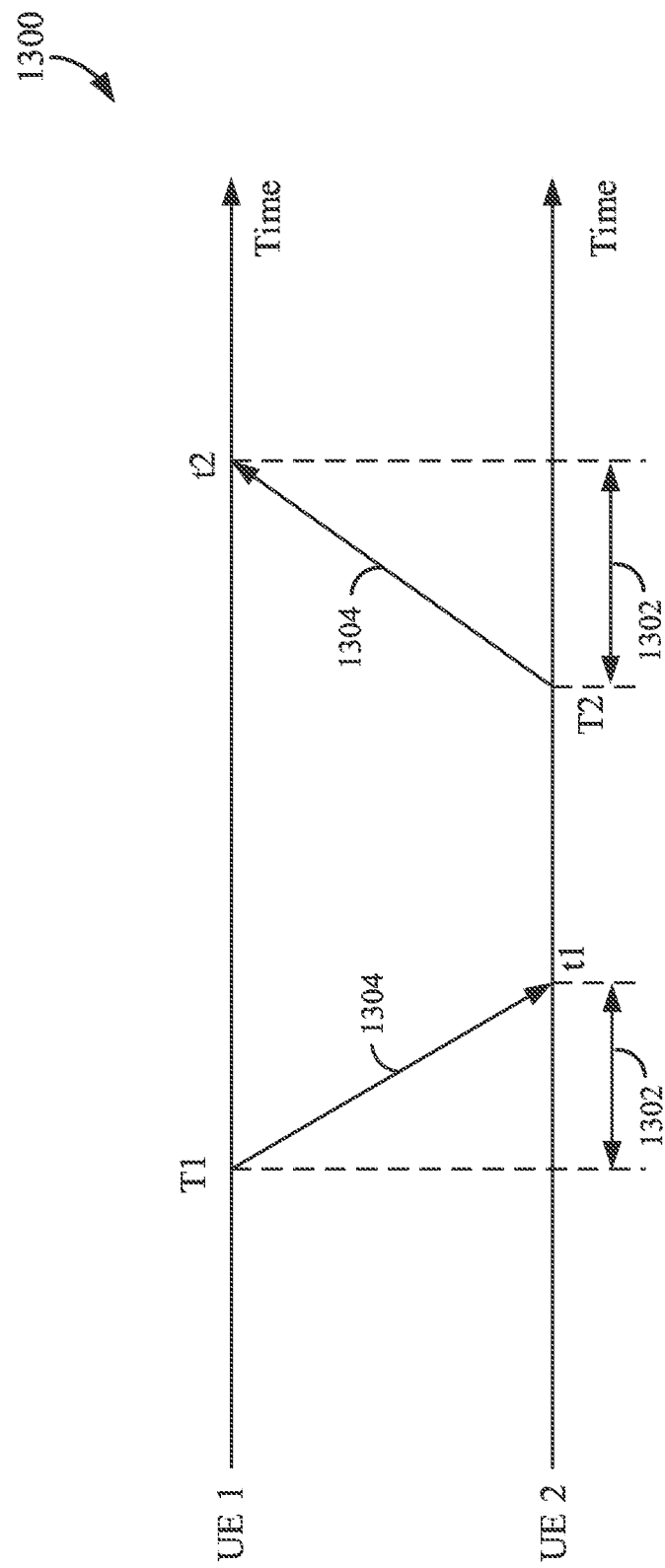
FIG. 13 is a timing diagram illustrating Time-of-Arrival (ToA) determination of ranging signals according to some aspects of the disclosure.

FIG. 13 is a timing diagram 1300 illustrating ToA determination of ranging signals in accordance with some aspects of the disclosure. The timing diagram 1300 shows a first UE (UE 1) and a second UE (UE 2), each transmitting a ranging signal. In one example, the first UE may be the vehicle 808 of FIG. 8, and the second UE may be the vehicle 810 of FIG. 8. Due to clock or time offsets between the first and second UEs, the ToAs measured by each UE may not reflect the actual ranging signal propagation time 1302. To compensate for or cancel the clock/time offset, after the ranging cycle, each UE can broadcast to other UEs its measured ToAs and optionally its own TX/RX chain delays on each of its RF antennas, during the third time period 1206 (see FIG. 12). The TX/RX chain delays of a UE may be constant parameters specific to the UE and may be measured and stored on the UE beforehand. This information can be used to compensate for or cancel clock offsets when calculating the ranges or distances between UEs. Alternatively, the UE may first internally adjust the ToA measurements using its TX/RX chain delays and broadcast its adjusted ToAs to other UEs.

In one example, each of UE 1 and UE 2 broadcasts a ranging signal 1304 as shown FIG. 13. The nominal transmission time for UE 1's ranging signal is shown as T1, and the nominal transmission time for UE 2's ranging signal is shown as T2. The measured ToA of the ranging signal sent by UE 1 as received at UE 2 is referred to as time t1, and the measured ToA of the ranging signal sent by UE 2 as received by UE 1 is referred to as time t2. The clock offset of UE 1 is referred to as p1, and the clock offset of UE 2 is referred to as p2. The TX/RX chain delay (if used) of UE 1 is referred to respectively as q_tx1 and q_rx1, and the TX/RX chain delay (if used) of UE 2 is referred to respectively as q_tx2 and q_rx2. The distance between UE 1 and UE 2 is referred to as d12, and the speed of light is referred to as c.

Accordingly, t1 and t2 can be determined as follows:

$$t1 = T1 + p1 + q\_tx1 + d12/c + q\_rx2 - p2 \quad \text{Equation 1}$$

$$t2 = T2 + p2 + q\_tx2 + d12/c + q\_rx1 - p1 \quad \text{Equation 2}$$

Equation 1 shows that UE 1 transmits its ranging signal at nominal time T1 (i.e., time T1 according to its local clock). If its clock has an offset of p1 compared to the true time, UE 1 actually transmits at time T1+p1. After the delay (q_tx1) of UE 1's TX chain, the propagation time d12/c, and the delay (q_rx2) at UE 2's Rx chain, the ranging signal is received by UE 2 at time T1+p1+q_tx1+d12/c+q_rx2. However, due to UE 2's clock offset (p2), the ToA measured by UE 2 is further adjusted by p2.

Equation 2 shows that UE 2 transmits its ranging signal at nominal time T2 (i.e., time T2 according to its local clock). If its clock has an offset of p2 compared to the true time, UE 2 actually transmits at time T2+p2. After the delay (q_tx2) at UE 2's TX chain, the propagation time d12/c, and the delay (q_rx1) at UE 1's Rx chain, the ranging signal is received by UE 1 at time T2+p2+q_tx2+d12/c+q_rx1. However, due to UE 1's clock offset (p1), the ToA measured by UE 1 is further adjusted by p1.

Adding the two equations together, the clock offsets p1 and p2 are canceled out. Rearranging the terms results in:

$$d12 = c((t1-T1)+(t2-T2)-(q\_tx1+q\_rx1)-(q\_tx2+q\_rx2))/2. \quad \text{Equation 3}$$

Therefore, if UE 1 broadcasts the ToA (t2) and the sum of its TX/RX chain delay q_tx1+q_rx1, and UE 2 broadcasts its ToA (t1) and the sum of its TX/RX chain delay q_tx2+q_rx2, both UEs can compute d12 (range) according to the above equation. Note that T1 and T2 are known to both UEs because the associated time slot IDs are broadcast before the ranging cycle.

Alternatively, UE 1 can broadcast an adjusted ToA t2'=t2−(q_tx1+q_rx1), and UE 2 can broadcast an adjusted ToA t1'=t1−(q_tx2+q_rx2). In this example, the distance d12 can be computed as:

$$d12 = c((t1'-T1)+(t2'-T2))/2. \quad \text{Equation 4}$$

Figure 14:
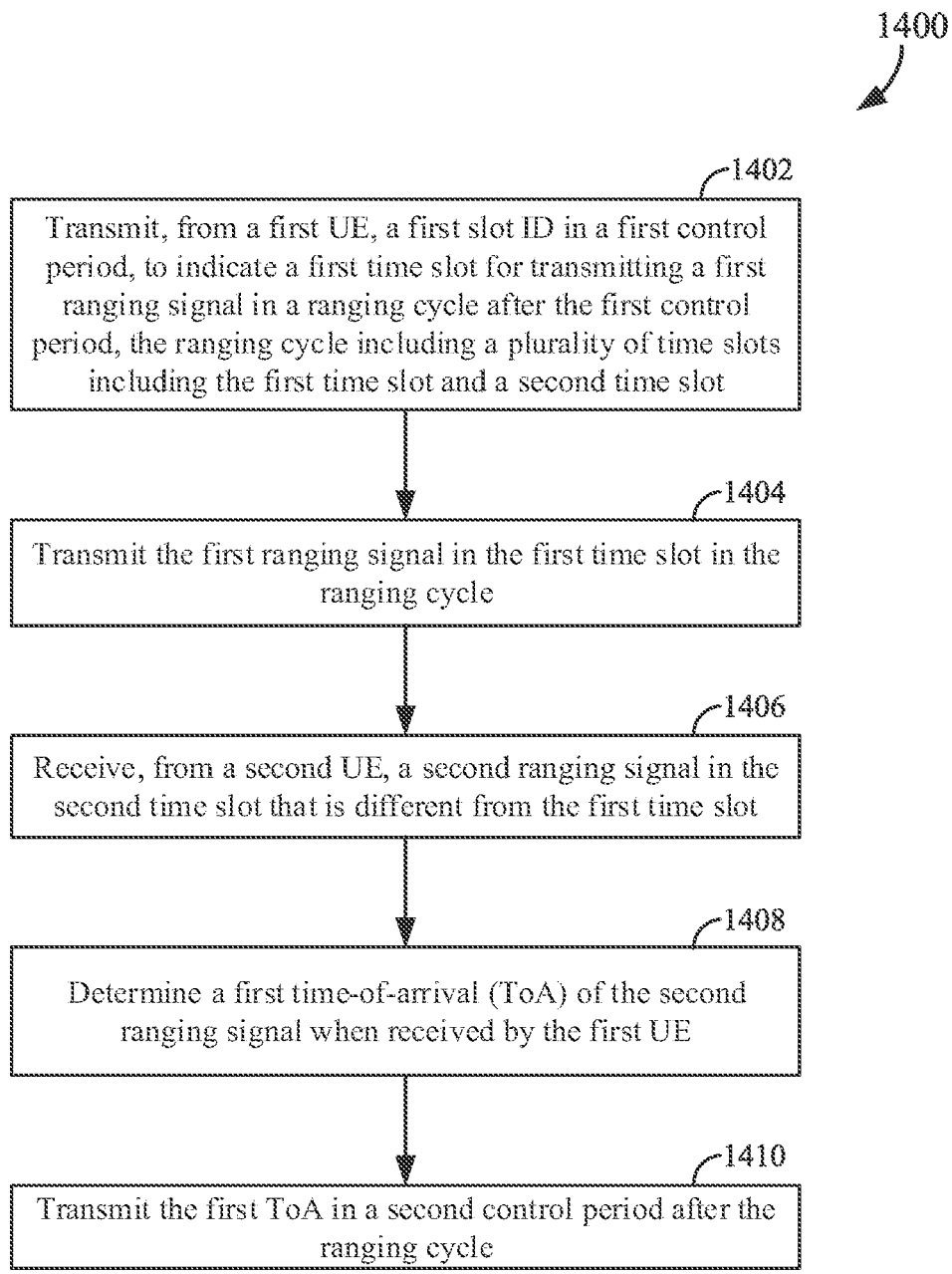
FIG. 14 is a flow chart illustrating an exemplary process for performing a ranging operation according to some aspects of the disclosure.

FIG. 14 is a flow chart illustrating an exemplary process 1400 for performing a ranging operation between UEs in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by a UE or vehicle illustrated in any of FIGS. 1, 2, 3, 7, 8, and/or 11. In some examples, the UE or vehicle may be the scheduling entity 500 illustrated in FIG. 5. In some examples, the UE or vehicle may be the scheduled entity 600 illustrated in FIG. 6. In some examples, the process 1400 may be carried out by any suitable apparatus or means for carrying out the functions, procedures, or algorithm described below.

At block 1402, a first UE may transmit a first slot ID in a first control period, to indicate a first time slot for transmitting a first ranging signal in a ranging cycle after the first control period. The ranging cycle includes a plurality of time slots, including the first time slot and a second time slot. In one example, the first UE may be the vehicle 808 that uses a ranging circuit 642 and/or the transceiver 610 (see FIG. 6) to broadcast a slot ID in a PSSCH 1210 in a first control period 1202 as shown in FIG. 12. The slot ID indicates the time slot in which the UE transmits a ranging signal in an upcoming ranging cycle 1204 (See FIG. 12).

At block 1404, the first UE may use the transceiver 610 to transmit the first ranging signal in the first time slot in the ranging cycle. For example, the first time slot may be a time slot 1218 in a PSRCH 1216 (see FIG. 12) allocated to the first UE for transmitting the ranging signal. The time slot may be one of a plurality of time slots in a ranging cycle, for example, illustrated in FIG. 10. In some examples, the ranging signal may include a number of UWB pulses with a bandwidth greater than narrowband carrier signals (e.g., 500 MHz).

At block 1406, the first UE may use the transceiver 610 to receive, from a second UE, a second ranging signal in the second time slot that is different from the first time slot in the ranging cycle. For example, the second UE may be the vehicle 810 (see FIG. 8) that transmits a ranging signal 814 (see FIG. 8) in an allocated time slot in the PSRCH 1216. The ranging signals of the first UE and second UE are transmitted in different time slots of the ranging cycle (e.g., ranging cycle 1000 of FIG. 10).

At block 1408, the first UE may use the ranging circuit 642 to determine a first ToA of the second ranging signal when received by the first UE. The first ToA may be the time when the first UE receives the second ranging signal. The first UE may determine the first ToA (e.g., t2 of FIG. 13) based on its local clock or time reference as described above in relation to FIG. 13. Similarly, the second UE determines a second ToA of the first ranging signal when received by the second UE. The second ToA may be the time when the second UE receives the first ranging signal from the first UE. The second UE may determine the second ToA (e.g., t1 of FIG. 13) based on its local clock or time reference as described above in relation to FIG. 13.

At block 1410, the first UE may use the transceiver 610 to transmit the first ToA in a second control period after the ranging cycle. For example, the first UE may transmit the first ToA in a PSSCH 1214 in a second control period 1206 as shown in FIG. 12. In the second control period, the first UE may receive the second ToA broadcast from the second UE for the first UE's ranging signal.

Figure 15:
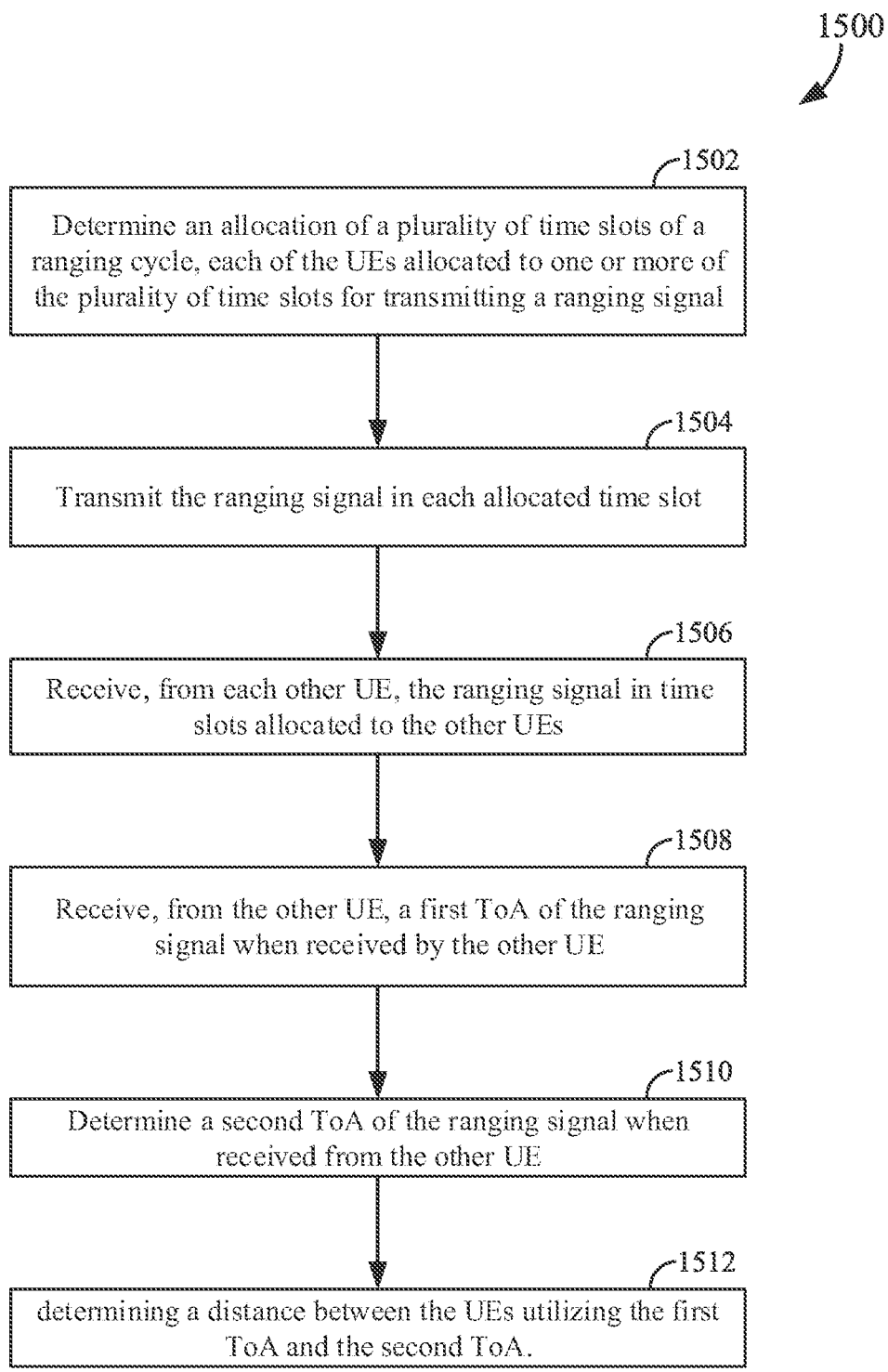
FIG. 15 is a flow chart illustrating another exemplary process for performing a ranging operation according to some aspects of the disclosure.

FIG. 15 is a flow chart illustrating another exemplary process 1500 for performing a ranging operation among a plurality of UEs in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by a UE or vehicle illustrated in any of FIGS. 1, 2, 3, 7, 8, and/or 11. In some examples, the UE or vehicle may be the scheduling entity 500 illustrated in FIG. 5. In some examples, the UE or vehicle may be the scheduled entity 600 illustrated in FIG. 6. In some examples, the process 1500 may be carried out by any suitable apparatus or means for carrying out the functions, procedures, or algorithm described below.

At block 1502, a UE determines an allocation of a plurality of time slots of a ranging cycle. For example, the UE may be one of a plurality of UEs capable of performing V2X ranging operation in a ranging cycle 1000. In the time slot allocation, each of the UEs is allocated to one or more of the plurality of time slots for transmitting a ranging signal. The UE may use a ranging circuit 642 to determine the allocation.

At block 1504, the UE transmits the ranging signal in each allocated time slot. In one example, each UE transmits a ranging signal in the corresponding time slot(s). The ranging signal may be a plurality of UWB pulses 1004 (see FIG. 10) distributed in time the slot. The UE may use the transceiver 610 to transmit the ranging signal.

At block 1506, the UE receives, from each other UE, the ranging signal in the corresponding time slots allocated to the other UEs. The UE may use the transceiver 610 to receive the ranging signals. At block 1508, the UE receives, from the other UE using the transceiver 610, a first ToA of the ranging signal when received by the other UE. The UE may receive a ToA from each other UE. At block 1510, the UE determines a second ToA of the ranging signal when received from the other UE. The UE may use the ranging circuit 642 to determine a ToA for each received ranging signal. At block 1512, the UE may use the ranging circuit 642 to determine a distance between the UEs based on the first ToA and the second ToA. That is, the UE can determine a distance (range) between itself and each other UE.

Figure 16:
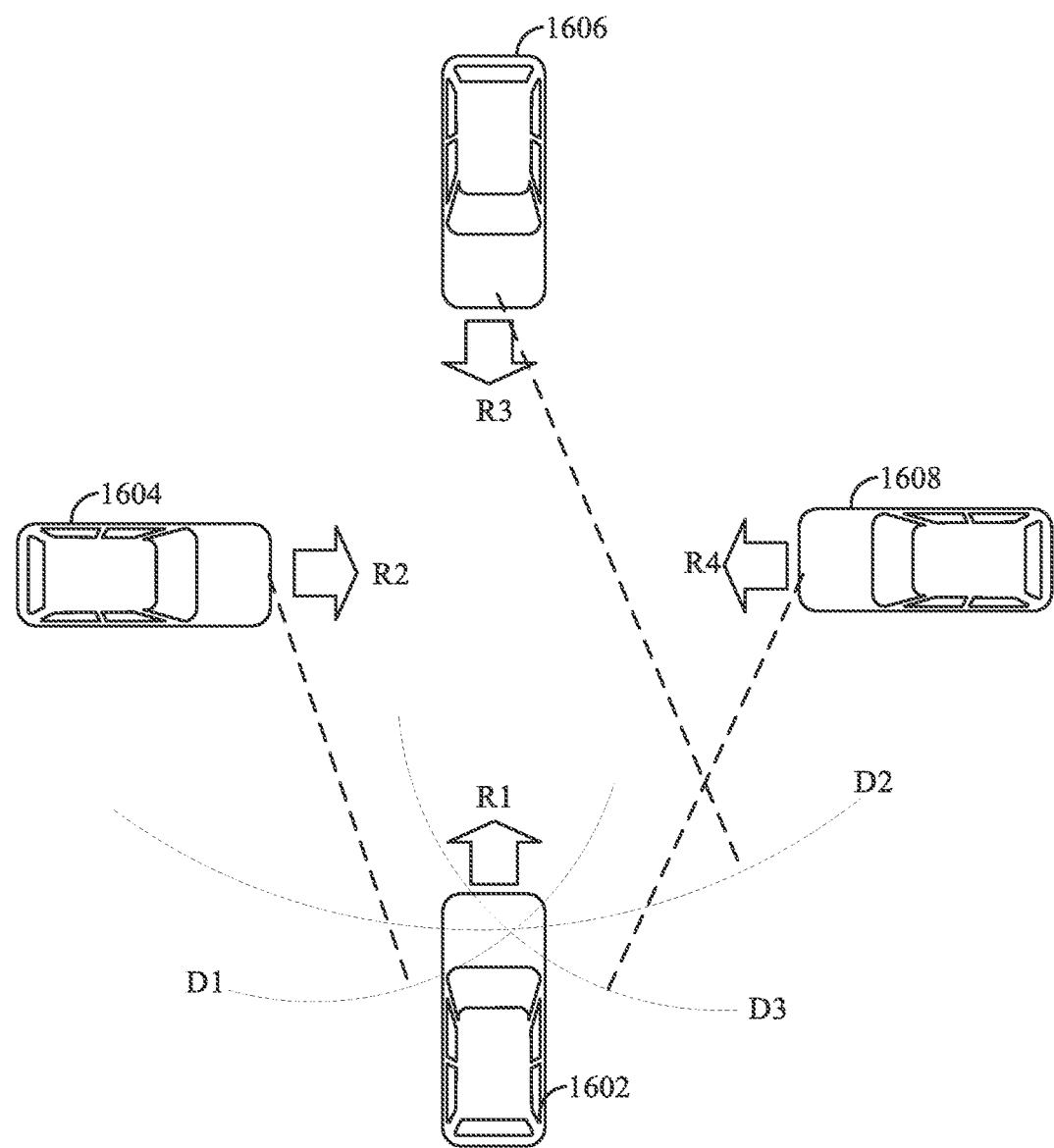
FIG. 16 is a diagram illustrating a positioning process based on ranging according to some aspects of the disclosure.

FIG. 16 is a diagram illustrating a positioning process based on ranging in accordance with some aspects of the present disclosure. As described below, some or all illustrated features may be omitted in a particular implementation within the scope of the present disclosure, and some illustrated features may not be required for implementation of all embodiments. In some examples, the positioning process may be performed by any of the UEs, devices, or vehicles illustrated in any of FIGS. 1, 2, 3, 5-8, and/or 11 to determine a position using multilateration.

Referring to FIG. 16, a first UE 1602 may transmit a ranging signal R1 for ranging operations. The first UE 1602 may receive ranging signals from three or more UEs or devices, for example, a ranging signal R2 from a second UE 1604, a ranging signal R3 from a third UE 1606, and a ranging signal R4 from a fourth UE 1608. These ranging signals (R1, R2, R3, R4) may be UWB ranging signals similar to those described above in relation to FIG. 10. The first UE can determine the distances (e.g., D1, D2, and D3) from the second, third, and fourth UEs using the ranging methods described above in relation to FIGS. 12-15. If the first UE knows the accurate positions (e.g., geographic coordinates) of the second, third, and fourth UEs, the first UE can determine its own accurate position, for example, using multilateration techniques based on the known positions and distances of the other UEs. In one example, the second, third, and fourth UEs may be RSUs or other fixed devices with their accurate positions known by the first UE. In another example, the second, third, and fourth UEs may have the capability to determine and report their respective accurate positions, for example, using GNSS based methods, visual, and/or other suitable methods. The first UE may receive the other UEs' positions via V2V communication.

Figure 17:
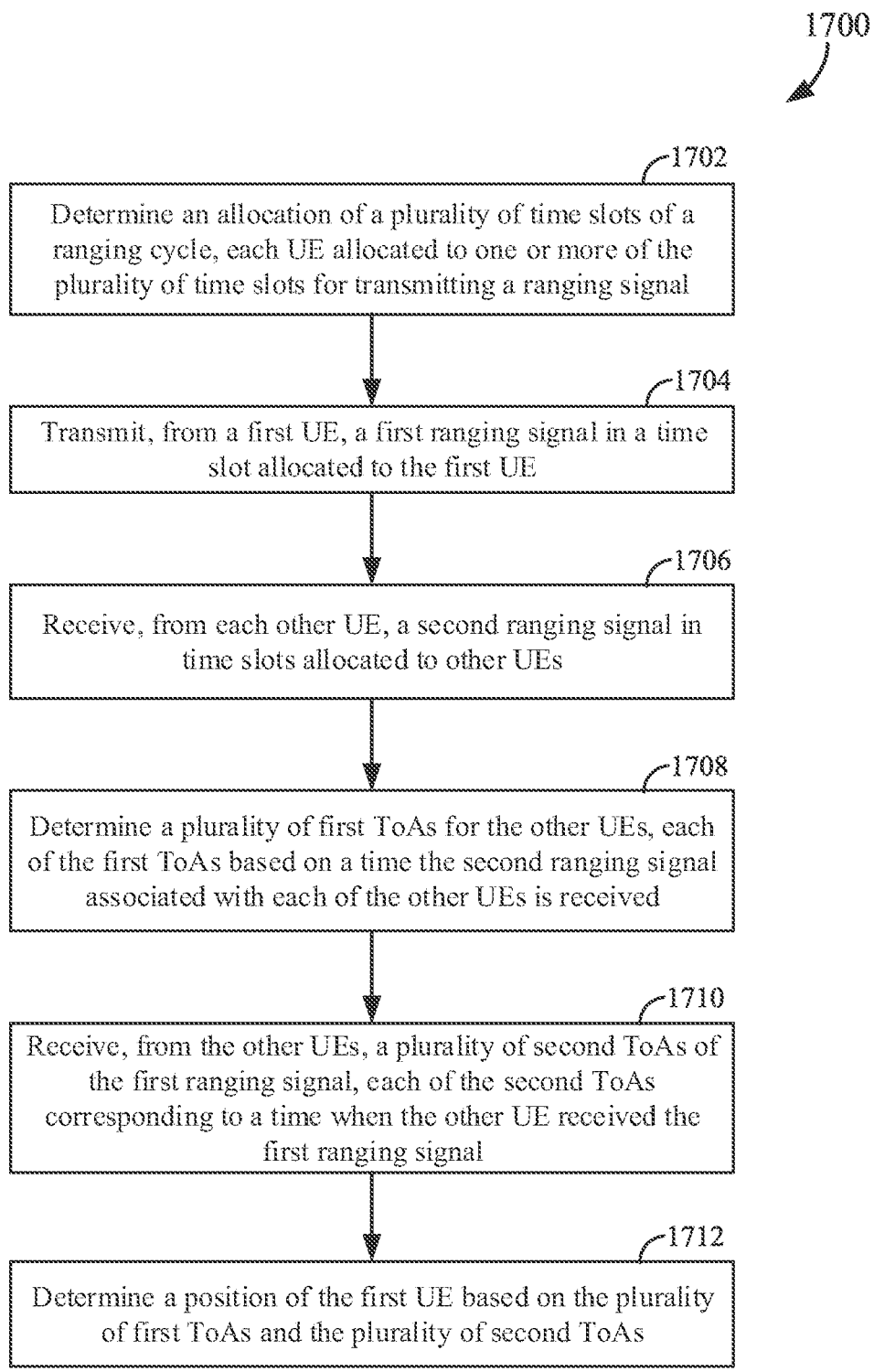
FIG. 17 is a flow chart illustrating an exemplary process for determining a position of a device using a ranging based method according to some aspects of the disclosure.

FIG. 17 is a flow chart illustrating an exemplary process 1700 for determining a position of a device using a ranging based method in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by an apparatus (e.g., UE or vehicle) illustrated in any of FIGS. 1, 2, 3, 5-8, 11, and/or 16. In some examples, the apparatus may be the scheduling entity 500 illustrated in FIG. 5. In some examples, the apparatus may be the scheduled entity 600 illustrated in FIG. 6. In some examples, the process 1700 may be carried out by any suitable apparatus or means for carrying out the functions, procedures, or algorithm described below.

At block 1702, a first UE (e.g., UE 1602 of FIG. 16) determines an allocation of a plurality of time slots of a ranging cycle for a plurality of UEs. Each UE is allocated to one or more of the plurality of time slots for transmitting a ranging signal. For example, the ranging cycle may be the ranging cycle described above in relation to FIGS. 9-10. The first UE may use the ranging circuit 642 to determine the allocation of the time slots and the corresponding UEs.

At block 1704, the first UE transmits a first ranging signal in a time slot allocated to the first UE. The first UE may use the transceiver 610 to transmit the first ranging signal to other UEs (e.g., UE 1604, UE 1606, and UE 1608 of FIG. 16). In some examples, the first ranging signal may be a UWB signal including a number of UWB signal pulses. At block 1706, the first UE receives a second ranging signal, associated with each of the other UEs, in each time slot allocated to the other UEs. The first UE may use the transceiver 610 to receive the second ranging signal. In some examples, the second ranging signal may be a UWB signal including a number of UWB signal pulses.

At block 1708, the first UE determines a plurality of first ToAs for the other UEs. Each of the first ToAs is based on a time the second ranging signal associated with each of the other UEs is received. The first UE may use the ranging circuit 642 and/or processing circuit 640 to determine the first ToAs. At block 1710, the first UE receives a plurality of second ToAs of the first ranging signal. Each of the second ToAs corresponds to a time when the other UE received the first ranging signal. The first UE may use the transceiver 610 to receive the plurality of second ToAs, for example, in a control period after the ranging cycle.

At block 1712, the first UE determines a position of the first UE based on the plurality of first ToAs and the plurality of second ToAs. For example, the first UE may use the ranging circuit 642 and/or processing circuit 640 to determine the position of the first UE using a multilateration algorithm based on the first ToAs and second ToAs.

In one configuration, the apparatus 500 and/or 600 for wireless communication includes various means for performing the ranging functions and various procedures described in relation to FIGS. 7-17. In one aspect, the aforementioned means may be the processor(s) 504 or 604 in FIG. 5 or 6 configured to perform the functions recited by the aforementioned means. In another aspect, the aforementioned means may be a circuit or any apparatus configured to perform the functions recited by the aforementioned means.

Of course, in the above examples, the circuitry included in the processor 504 or 604 is merely provided as an example, and other means for carrying out the described functions may be included within various aspects of the present disclosure, including but not limited to the instructions stored in the computer-readable storage medium 506/

606, or any other suitable apparatus or means described in any one of the FIGS. 1, 2, 3-8, 11, and/or 16, and utilizing, for example, the processes and/or algorithms described herein in relation to FIGS. 7-17.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A first user equipment (UE), comprising:
   a transceiver configured for performing ranging using a ranging period comprising a first control period, a ranging cycle comprising a plurality of time slots including a first time slot and a second time slot, and a second control period;
   a memory; and
   a processor operatively coupled with the transceiver and the memory,
   wherein the processor and the memory are configured to:
      transmit, in a first spectrum via the transceiver, a first slot ID in the first control period, to indicate the first time slot for transmitting a first ranging signal in the ranging cycle, the first ranging signal configured for determining a time-of-arrival of the first ranging signal at a second UE;
      transmit, in a second spectrum that is wider than the first spectrum via the transceiver, the first ranging signal in the first time slot in the ranging cycle;
      receive, from the second UE via the transceiver, a second ranging signal in the second time slot in the ranging cycle that is different from the first time slot;
      determine a first time-of-arrival (ToA) of the second ranging signal when received by the first UE; and
      transmit, in the first spectrum via the transceiver, the first ToA in the second control period after the ranging cycle.

2. The first UE of claim 1, wherein the first spectrum comprises a licensed spectrum, and the second spectrum comprises an unlicensed spectrum.

3. The first UE of claim 1, wherein the first ranging signal comprises one or more ultra-wideband (UWB) pulses distributed in the first time slot.

4. The first UE of claim 3, wherein each of the plurality of time slots comprises a guard time.

5. The first UE of claim 1,
wherein the first ranging signal comprises a first ultra-wideband (UWB) signal, and
wherein the second ranging signal comprises a second UWB signal that uses same network resources as the first UWB signal.

6. The first UE of claim 1, wherein the processor and the memory are further configured to:
receive, from the second UE via the transceiver, a second slot ID in the first control period;
identify the second time slot for receiving the second ranging signal in the ranging cycle based on the second slot ID; and
receive, from the second UE via the transceiver, a second ToA of the first ranging signal when received by the second UE.

7. The first UE of claim 6, wherein the processor and the memory are further configured to:
determine a distance between the first UE and the second UE based on the first ToA and the second ToA.

8. The first UE of claim 7, wherein the processor and the memory are further configured to:
compensate for a clock offset between the first UE and the second UE.

9. The first UE of claim 1, wherein the processor and the memory are further configured to:
receive, via the transceiver, a plurality of ranging signals from a plurality of user equipments (UEs) including the second UE, the plurality of ranging signals respectively received in distinct time slots of the plurality of time slots in the ranging cycle.

10. A first user equipment (UE) for wireless communication, comprising:
a transceiver configured for performing ranging with a plurality of user equipments (UEs) including a second UE;
a memory; and
a processor operatively coupled with the transceiver and the memory,
wherein the processor and the memory are configured to:
receive, in a first spectrum, a slot ID from each of the plurality of UEs;
determine an allocation of a plurality of time slots of a ranging cycle based on the respective slot IDs received from the plurality of UEs, such that each of the plurality of UEs is allocated to one or more of the plurality of time slots indicated by the respective slot IDs for transmitting a ranging signal;
transmit, in a second spectrum that is wider than the first spectrum via the transceiver, a first ranging signal in a first time slot of the ranging cycle allocated to the first UE;
receive, from the second UE via the transceiver, a second ranging signal in a second time slot of the ranging cycle allocated to the second UE;
receive, in the first spectrum from the second UE via the transceiver, a first time-of-arrival (ToA) of the first ranging signal when received by the second UE;
determine a second ToA of the second ranging signal when received by the first UE; and
determine a distance between the first UE and the second UE based on the first ToA and the second ToA.

11. The UE of claim 10, wherein the processor and the memory are further configured to:
adjust the first ToA and the second ToA to compensate for a time offset between the first UE and the second UE.

12. A method of performing ranging at a first user equipment (UE) during a ranging period comprising a first control period, a ranging cycle comprising a plurality of time slots including a first time slot and a second time slot, and a second control period, the method comprising:
transmitting, in a first spectrum, a first slot ID in the first control period, to indicate the first time slot for transmitting a first ranging signal in the ranging cycle, the first ranging signal configured for determining a time-of-arrival of the first ranging signal at a second UE;
transmitting, in a second spectrum that is wider than the first spectrum, the first ranging signal in the first time slot in the ranging cycle;
receiving, from the second UE, a second ranging signal in the second time slot in the ranging cycle that is different from the first time slot;
determining a first time-of-arrival (ToA) of the second ranging signal when received by the first UE; and
transmitting, in the first spectrum, the first ToA in the second control period after the ranging cycle.

13. The method of claim 12, wherein the first spectrum comprises a licensed spectrum, and the second spectrum comprises an unlicensed spectrum.

14. The method of claim 12, wherein the first ranging signal comprises one or more ultra-wideband (UWB) pulses distributed in the first time slot.

15. The method of claim 14, wherein each of the plurality of time slots comprises a guard time.

16. The method of claim 12,
wherein the first ranging signal comprises a first ultra-wideband (UWB) signal, and
wherein the second ranging signal comprises a second UWB signal that uses same network resources as the first UWB signal.

17. The method of claim 12, further comprising:
receiving, from the second UE, a second slot ID in the first control period;
identifying the second time slot for receiving the second ranging signal in the ranging cycle based on the second slot ID; and
receiving, from the second UE, a second ToA of the first ranging signal when received by the second UE.

18. The method of claim 17, further comprising:
determining a distance between the first UE and the second UE based on the first ToA and the second ToA.

19. The method of claim 18, wherein the determining the distance comprises:
compensating for a clock offset between the first UE and the second UE.

20. The method of claim 12, further comprising:
receiving a plurality of ranging signals from a plurality of user equipments (UEs) including the second UE, the plurality of ranging signals respectively received in distinct time slots of the plurality of time slots in the ranging cycle.

21. A method of performing ranging among a plurality of user equipments (UEs) including a first UE and a second UE, the method comprising:
receiving, in a first spectrum, a slot ID from each of the plurality of UEs;
determining an allocation of a plurality of time slots of a ranging cycle based on the respective slot IDs received from the plurality of UEs, such that each of the plurality of UEs is allocated to one or more of the plurality of time slots indicated by the respective slot IDs for transmitting a ranging signal;

transmitting, in a second spectrum that is wider than the first spectrum, a first ranging signal in a first time slot of the ranging cycle allocated to the first UE;

receiving, from the second UE, a second ranging signal in a second time slot of the ranging cycle allocated to the second UE;

receiving, in the first spectrum from the second UE, a first time-of-arrival (ToA) of the first ranging signal when received by the second UE;

determining a second ToA of the second ranging signal when received by the first UE; and determining a distance between the first UE and the second UE based on the first ToA and the second ToA.

22. The method of claim 21, further comprising:

adjusting the first ToA and the second ToA to compensate for a time offset between the first UE and the second UE.

* * * * *